United States Patent
Sumasu

(10) Patent No.: US 10,498,282 B2
(45) Date of Patent: Dec. 3, 2019

(54) MOTOR CONTROL DEVICE

(71) Applicant: JTEKT CORPORATION, Osaka-shi, Osaka (JP)

(72) Inventor: Hiroshi Sumasu, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/185,716

(22) Filed: Nov. 9, 2018

(65) Prior Publication Data
US 2019/0149077 A1    May 16, 2019

(30) Foreign Application Priority Data
Nov. 16, 2017   (JP) ................................ 2017-220993

(51) Int. Cl.
*H02P 7/29* (2016.01)
*B62K 21/00* (2006.01)
*H02P 27/08* (2006.01)
*H02P 21/22* (2016.01)
*B62D 5/04* (2006.01)

(52) U.S. Cl.
CPC .............. *H02P 27/08* (2013.01); *H02P 21/22* (2016.02); *B62D 5/0409* (2013.01); *B62D 5/0463* (2013.01)

(58) Field of Classification Search
USPC ........................................................ 318/599
See application file for complete search history.

(56) References Cited

U.S. PATENT DOCUMENTS

| | | | | |
|---|---|---|---|---|
| 5,712,539 A | * | 1/1998 | Zweighaft | H02P 6/14 318/364 |
| 5,742,139 A | * | 4/1998 | Kolomeitsev | H02P 25/08 318/254.2 |
| 6,002,226 A | * | 12/1999 | Collier-Hallman | H02P 6/10 318/139 |
| 2005/0110442 A1 | * | 5/2005 | Trifilo | H02P 6/10 318/400.23 |
| 2007/0090785 A1 | * | 4/2007 | Ho | H02M 7/53875 318/812 |

(Continued)

FOREIGN PATENT DOCUMENTS

JP    S64-50766 A    2/1989

OTHER PUBLICATIONS

Apr. 8, 2019 Extended European Search Report issued in European Patent Application No. 18206283.6.

*Primary Examiner* — Bentsu Ro
(74) *Attorney, Agent, or Firm* — Oliff PLC

(57) ABSTRACT

A common mode noise reduction section performs a first noise reduction process in a first system, a second noise reduction process in a second system and a third noise reduction process in the case where the two systems have a phase, a current for which that flows through a stray capacitance is not canceled out in at least one PWM cycle in a current control cycle after the first noise reduction process is performed and the second noise reduction process is performed. The third noise reduction process includes shifting a PWM count for each phase in the first system by a first predetermined amount and shifting a PWM count for each phase in the second system by a second predetermined amount such that the currents for such a phase which flow through the stray capacitances in the two systems cancel out each other in the relevant PWM cycle.

3 Claims, 16 Drawing Sheets

(56) References Cited

U.S. PATENT DOCUMENTS

| | | |
|---|---|---|
| 2011/0260656 A1 | 10/2011 | Kazama et al. |
| 2013/0062138 A1 | 3/2013 | Naitou et al. |
| 2014/0091735 A1* | 4/2014 | Vogt .................. H02P 7/28 318/3 |
| 2017/0279345 A1 | 9/2017 | Klotz et al. |

* cited by examiner

FIG. 11A

| CYCLE NUMBER i | 1 | 2 | 3 | 4 | 5 | 6 | 7 | 8 | 9 | 10 | TOTAL |
|---|---|---|---|---|---|---|---|---|---|---|---|
| $C_{u_1}$ SET IN S1 | 300 | 300 | 300 | 300 | 300 | 300 | 300 | 300 | 300 | 300 | 3000 |
| $C_{v_1}$ SET IN S1 | 350 | 350 | 350 | 350 | 350 | 350 | 350 | 350 | 350 | 350 | 3500 |
| $C_{w_1}$ SET IN S1 | 400 | 400 | 400 | 400 | 400 | 400 | 400 | 400 | 400 | 400 | 4000 |
| $C_{u_2}$ SET IN S2 | 200 | 200 | 200 | 200 | 200 | 200 | 200 | 200 | 200 | 200 | 2000 |
| $C_{v_2}$ SET IN S2 | 100 | 100 | 100 | 100 | 100 | 100 | 100 | 100 | 100 | 100 | 1000 |
| $C_{w_2}$ SET IN S2 | 300 | 300 | 300 | 300 | 300 | 300 | 300 | 300 | 300 | 300 | 3000 |

FIG. 11B

| CYCLE NUMBER i | 1 | 2 | 3 | 4 | 5 | 6 | 7 | 8 | 9 | 10 | TOTAL |
|---|---|---|---|---|---|---|---|---|---|---|---|
| $C_{u_1}$ SET IN S3 | 300 | 300 | 300 | 300 | 300 | 300 | 300 | 300 | 300 | 300 | 3000 |
| $C_{v_1}$ SET IN S3 | 350 | 350 | 350 | 350 | 350 | 350 | 350 | 350 | 350 | 350 | 3500 |
| $C_{w_1}$ SET IN S3 | 390 | 390 | 390 | 390 | 390 | 390 | 390 | 390 | 390 | 390 | 3900 |
| $C_{u_2}$ SET IN S3 | 210 | 210 | 210 | 210 | 210 | 210 | 210 | 210 | 210 | 210 | 2100 |
| $C_{v_2}$ SET IN S3 | 100 | 100 | 100 | 100 | 100 | 100 | 100 | 100 | 100 | 100 | 1000 |
| $C_{w_2}$ SET IN S3 | 290 | 290 | 290 | 290 | 290 | 290 | 290 | 290 | 290 | 290 | 2900 |

FIG. 12A

| CYCLE NUMBER i | 1 | 2 | 3 | 4 | 5 | 6 | 7 | 8 | 9 | 10 | TOTAL |
|---|---|---|---|---|---|---|---|---|---|---|---|
| FIRST AMPLITUDE PATTERN | x | -x | x | -x | x | -x | x | -x | x | -x | 0 |
| SECOND AMPLITUDE PATTERN | -x | x | -x | x | -x | x | -x | x | -x | x | 0 |

FIG. 12B

| CYCLE NUMBER i | 1 | 2 | 3 | 4 | 5 | 6 | 7 | 8 | 9 | 10 | TOTAL |
|---|---|---|---|---|---|---|---|---|---|---|---|
| AMPLITUDE FOR U-PHASE IN FIRST SYSTEM | 90 | -90 | 90 | -90 | 90 | -90 | 90 | -90 | 90 | -90 | 0 |
| AMPLITUDE FOR V-PHASE IN FIRST SYSTEM | -40 | 40 | -40 | 40 | -40 | 40 | -40 | 40 | -40 | 40 | 0 |
| AMPLITUDE FOR U-PHASE IN SECOND SYSTEM | 110 | -110 | 110 | -110 | 110 | -110 | 110 | -110 | 110 | -110 | 0 |
| AMPLITUDE FOR V-PHASE IN SECOND SYSTEM | 30 | -30 | 30 | -30 | 30 | -30 | 30 | -30 | 30 | -30 | 0 |

FIG. 12C

| CYCLE NUMBER i | 1 | 2 | 3 | 4 | 5 | 6 | 7 | 8 | 9 | 10 | TOTAL |
|---|---|---|---|---|---|---|---|---|---|---|---|
| $C_{u1}$ AT ACTUAL TIMING | 390 | 210 | 390 | 210 | 390 | 210 | 390 | 210 | 390 | 210 | 3000 |
| $C_{v1}$ AT ACTUAL TIMING | 310 | 390 | 310 | 390 | 310 | 390 | 310 | 390 | 310 | 390 | 3500 |
| $C_{w1}$ AT ACTUAL TIMING | 390 | 390 | 390 | 390 | 390 | 390 | 390 | 390 | 390 | 390 | 3900 |
| $C_{u2}$ AT ACTUAL TIMING | 320 | 100 | 320 | 100 | 320 | 100 | 320 | 100 | 320 | 100 | 4200 |
| $C_{v2}$ AT ACTUAL TIMING | 100 | 100 | 100 | 100 | 100 | 100 | 100 | 100 | 100 | 100 | 1000 |
| $C_{w2}$ AT ACTUAL TIMING | 320 | 260 | 320 | 260 | 320 | 260 | 320 | 260 | 320 | 260 | 2900 |

FIG. 13A

| CYCLE NUMBER i | 1 | 2 | 3 | 4 | 5 | 6 | 7 | 8 | 9 | 10 | TOTAL |
|---|---|---|---|---|---|---|---|---|---|---|---|
| $C_{u_1}$ AT ACTUAL TIMING | <u>285</u> | 235 | <u>285</u> | 235 | <u>285</u> | 235 | <u>285</u> | 235 | <u>285</u> | 235 | 2600 |
| $C_{v_1}$ AT ACTUAL TIMING | 205 | <u>415</u> | 205 | <u>415</u> | 205 | <u>415</u> | 205 | <u>415</u> | 205 | <u>415</u> | 3100 |
| $C_{w_1}$ AT ACTUAL TIMING | <u>285</u> | <u>415</u> | <u>285</u> | <u>415</u> | <u>285</u> | <u>415</u> | <u>285</u> | <u>415</u> | <u>285</u> | <u>415</u> | 3500 |
| $C_{u_2}$ AT ACTUAL TIMING | <u>435</u> | <u>75</u> | <u>435</u> | <u>75</u> | <u>435</u> | <u>75</u> | <u>435</u> | <u>75</u> | <u>435</u> | <u>75</u> | 2550 |
| $C_{v_2}$ AT ACTUAL TIMING | 205 | <u>75</u> | 205 | <u>75</u> | 205 | <u>75</u> | 205 | <u>75</u> | 205 | <u>75</u> | 1400 |
| $C_{w_2}$ AT ACTUAL TIMING | <u>435</u> | 235 | <u>435</u> | 235 | <u>435</u> | 235 | <u>435</u> | 235 | <u>435</u> | 235 | 3350 |

FIG. 13B

| CYCLE NUMBER i | 1 | 2 | 3 | 4 | 5 | 6 | 7 | 8 | 9 | 10 | TOTAL |
|---|---|---|---|---|---|---|---|---|---|---|---|
| FINAL $Cu_1$ | 285 | 235 | 285 | 235 | 285 | 235 | 285 | 235 | 285 | 235 | 2600 |
| FINAL $Cv_1$ | 205 | 415 | 205 | 415 | 205 | 415 | 205 | 415 | 205 | 415 | 3100 |
| FINAL $Cw_1$ | 295 | 425 | 295 | 425 | 295 | 425 | 295 | 425 | 295 | 425 | 3600 |
| FINAL $Cu_2$ | 425 | 65 | 425 | 65 | 425 | 65 | 425 | 65 | 425 | 65 | 2450 |
| FINAL $Cv_2$ | 205 | 75 | 205 | 75 | 205 | 75 | 205 | 75 | 205 | 75 | 1400 |
| FINAL $Cw_2$ | 445 | 245 | 445 | 245 | 445 | 245 | 445 | 245 | 445 | 245 | 3450 |

MOTOR CONTROL DEVICE

INCORPORATION BY REFERENCE

The disclosure of Japanese Patent Application No. 2017-220993 filed Nov. 16, 2017 including the specification, drawings and abstract, is incorporated herein by reference in its entirety.

BACKGROUND OF THE INVENTION

The present invention relates to a motor control device that controls an electric motor that has motor coils for three phases in two systems.

Description of the Related Art

In a motor control device that performs vector control on a three-phase electric motor, two-phase current command values are computed in each current control cycle. Two-phase voltage command values are computed on the basis of the deviation between the two-phase current command values and detected two-phase current values. The two-phase voltage command values are subjected to a two-phase/three-phase conversion performed using the rotational angle of the electric motor. Consequently, phase voltage command values (three-phase voltage command values) for U-phase, V-phase, and W-phase are computed. Then, a U-phase PWM signal, a V-phase PWM signal, and a W-phase PWM signal with a duty corresponding to the respective phase voltage command values for U-phase, V-phase, and W-phase are generated, and supplied to a three-phase inverter circuit.

Six switching elements that constitute the three-phase inverter circuit are controlled in accordance with the U-phase PWM signal, the V-phase PWM signal, and the W-phase PWM signal. Consequently, a voltage corresponding to the three-phase voltage command values is applied to the three-phase electric motor. Consequently, a motor current that flows through the three-phase electric motor is controlled so as to be equal to the two-phase current command values. In such a motor control device, a current flows through a stray capacitance that is present between the three-phase electric motor and a frame ground at the time of rise and the time of fall of output voltages (phase voltages) for various phases in each PWM cycle. (See Japanese Patent Application Publication No. 1-50766 (JP 1-50766 A).)

Since this current flows through the frame ground, noise is occasionally radiated from the frame ground. In the case where the motor control device is mounted on an electric power steering (EPS) system mounted on a vehicle, long positive and negative power supply lines extend from a vehicle power source (battery) to the EPS. Therefore, a noise current that flows through the frame ground intrudes into the positive and negative power supply lines in the vicinity of the vehicle power source through the stray capacitance which is formed between the positive and negative power supply lines and the frame ground. Then, the noise current flows through the long positive and negative power supply lines to radiate noise from the lines. Consequently, common mode noise is generated.

There is known a motor control device that controls a three-phase electric motor (two-system motor) that has two-system three-phase motor coils using two-system drive circuits that supply power to the respective two-system three-phase motor coils. In such a motor control device that controls the two-system motor, a current flows through a stray capacitance that is present between the three-phase electric motor and a frame ground at the time of rise and the time of fall of output voltages (phase voltages) for various phases in each PWM cycle for each of the two-system drive circuits. Therefore, in the case where the two-system motor is controlled, the frequency of generation of common mode noise is high compared to a case where drive of a three-phase electric motor (one-system motor) that has a one-system three-phase motor coil is controlled.

SUMMARY OF THE INVENTION

An object of the present invention is to provide a motor control device that is capable of reducing common mode noise.

An aspect of the present invention provides a motor control device that controls an electric motor that has motor coils for three phases in two systems including a first system and a second system, the motor control device including: a pulse width modulation (PWM) count computation unit that computes a PWM count for each phase in each system in each current control cycle that includes a plurality of PWM cycles; a PWM count setting unit that sets the PWM count for each phase in each system in a current control cycle as a PWM count in each PWM cycle in the relevant current control cycle for the corresponding phase in the corresponding system; and a common mode noise reduction unit, in which the common mode noise reduction unit includes a first reduction unit that performs a first noise reduction process such that, in the first system, a current that flows through a stray capacitance because of an output voltage for one phase is canceled out with a current that flows through the stray capacitance because of an output voltage for at least one of the two other phases in at least one PWM cycle in the current control cycle, the first noise reduction process including changing a PWM count in a PWM cycle for at least one of the two other phases, a second reduction unit that performs a second noise reduction process such that, in the second system, a current that flows through a stray capacitance because of an output voltage for one phase is canceled out with a current that flows through the stray capacitance because of an output voltage for at least one of the two other phases in at least one PWM cycle in the current control cycle, the second noise reduction process including changing a PWM count in a PWM cycle for at least one of the two other phases, and a third reduction unit that performs a third noise reduction process in the case where the two systems have a phase, a current for which that flows through a stray capacitance is not canceled out in at least one PWM cycle in the current control cycle after the first noise reduction process is performed by the first reduction unit and the second noise reduction process is performed by the second reduction unit, the third noise reduction process including shifting a PWM count for each phase in the first system by a first predetermined amount and shifting a PWM count for each phase in the second system by a second predetermined amount such that the currents for such a phase which flow through the stray capacitances in the two systems cancel out each other in the relevant PWM cycle.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 11A is a schematic table illustrating an example of PWM counts in each PWM cycle for each phase in each system set in steps S1 and S2;

FIG. 11B is a schematic table illustrating an example of PWM counts in each PWM cycle for each phase in each system set in step S3 in FIG. 8A;

FIG. 12A is a schematic table illustrating an example of two amplitude patterns;

FIG. 12B is a schematic table illustrating an example of the amplitude in each PWM cycle for U-phase in the first system, V-phase in the first system, U-phase in the second system, and W-phase in the second system;

FIG. 12C is a schematic table illustrating an example of PWM counts in each PWM cycle for each phase in the first system after a first PWM count change process and PWM counts in each PWM cycle for each phase in the second system after a fourth PWM count change process;

FIG. 13A is a schematic table illustrating an example of PWM counts for each phase in each system in each PWM cycle after the process in step S13 in FIG. 8B; and FIG. 13B is a schematic table illustrating an example of the final PWM counts for each phase in each system in each PWM cycle.

DETAILED DESCRIPTION OF EMBODIMENTS

Figure 1:
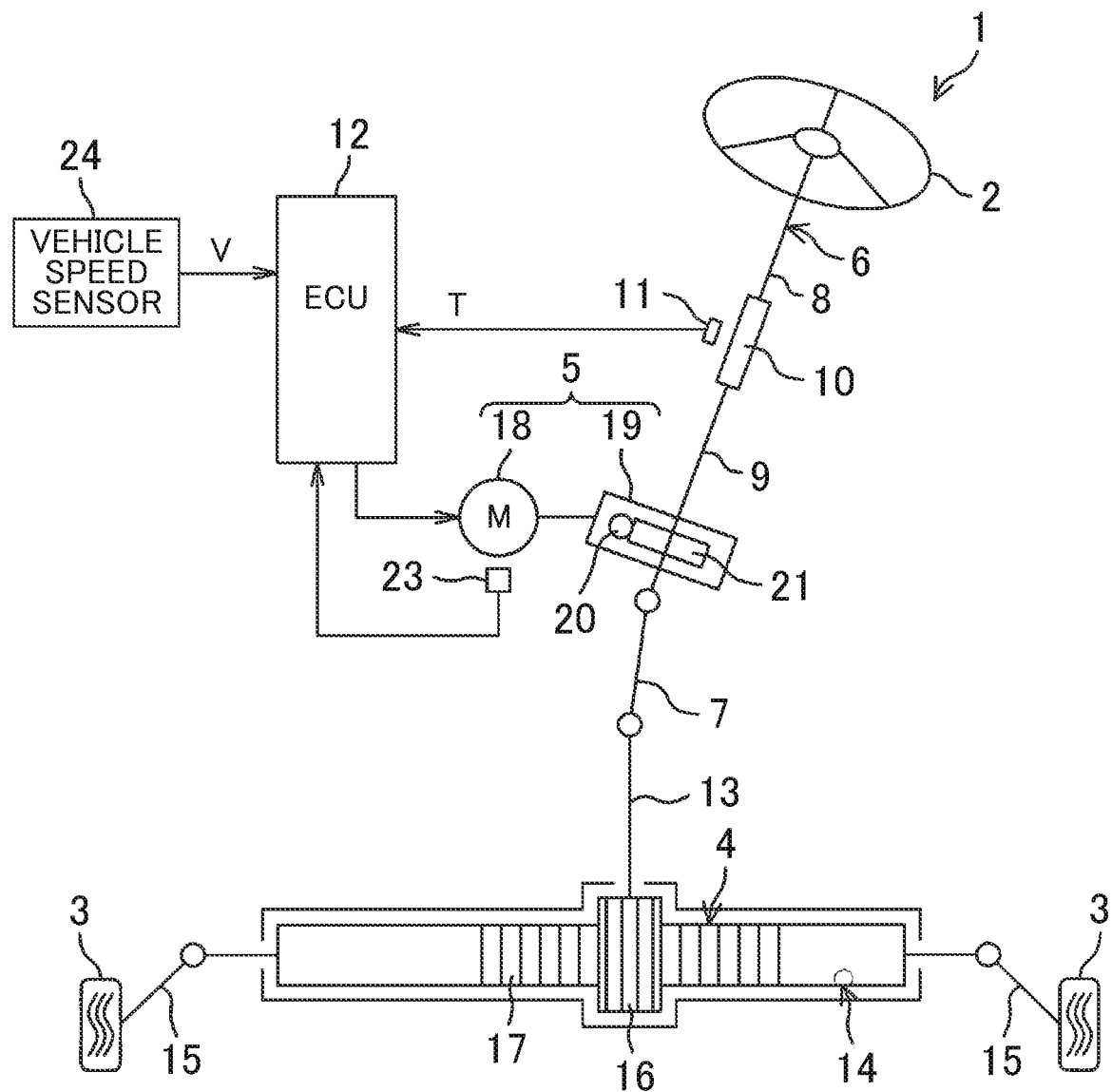
FIG. 1 is a schematic diagram illustrating a schematic configuration of an electric power steering system to which a motor control device according to an embodiment of the present invention is applied.

An embodiment in which the present invention is applied to an electric power steering system will be described in detail below with reference to the accompanying drawings. FIG. 1 is a schematic diagram illustrating a schematic configuration of an electric power steering system to which a motor control device according to an embodiment of the present invention is applied. An electric power steering (EPS) system 1 includes a steering wheel 2, a steering operation mechanism 4, and a steering assist mechanism 5. The steering wheel 2 is a steering member configured to steer the vehicle. The steering operation mechanism 4 steers steered wheels 3 in conjunction with rotation of the steering wheel 2. The steering assist mechanism 5 assists a driver in steering. The steering wheel 2 and the steering operation mechanism 4 are mechanically coupled to each other via a steering shaft 6 and an intermediate shaft 7.

The steering shaft 6 includes an input shaft 8 coupled to the steering wheel 2, and an output shaft 9 coupled to the intermediate shaft 7. The input shaft 8 and the output shaft 9 are coupled so as to be rotatable relative to each other via a torsion bar 10. A torque sensor 11 is disposed in the vicinity of the torsion bar 10. The torque sensor 11 detects steering torque T applied to the steering wheel 2 on the basis of the amount of relative rotational displacement between the input shaft 8 and the output shaft 9. In the embodiment, the steering torque T which is detected by the torque sensor 11 is detected as a positive value when the vehicle is steered to the right, and as a negative value when the vehicle is steered to the left, for example. The magnitude of the steering torque T is larger as the absolute value of the positive or negative value is larger.

The steering operation mechanism 4 is composed of a rack-and-pinion mechanism that includes a pinion shaft 13 and a rack shaft 14 that serves as a steered shaft. The steered wheels 3 are coupled to end portions of the rack shaft 14 via tie rods 15 and knuckle arms (not illustrated). The pinion shaft 13 is coupled to the intermediate shaft 7. The pinion shaft 13 is rotated in conjunction with a steering operation of the steering wheel 2. A pinion 16 is coupled to the distal end (the lower end in FIG. 1) of the pinion shaft 13.

The rack shaft 14 extends linearly along the right-left direction of the automobile. A rack 17 meshed with the pinion 16 is formed at an intermediate portion of the rack shaft 14 in the axial direction. The pinion 16 and the rack 17 convert rotation of the pinion shaft 13 into movement of the rack shaft 14 in the axial direction. The steered wheels 3 can be steered by moving the rack shaft 14 in the axial direction.

When the steering wheel 2 is operated (rotated), rotation of the steering wheel 2 is transferred to the pinion shaft 13 via the steering shaft 6 and the intermediate shaft 7. The pinion 16 and the rack 17 convert rotation of the pinion shaft 13 into movement of the rack shaft 14 in the axial direction. Consequently, the steered wheels 3 are steered. The steering assist mechanism 5 includes an electric motor 18 for steering assist, and a speed reduction mechanism 19 configured to transfer output torque from the electric motor 18 toward the steering operation mechanism 4. The electric motor 18 is a three-phase brushless motor (two-system motor) that has a three-phase motor coil 18A (see FIGS. 2 and 3) in a first system and a three-phase motor coil 18B (see FIGS. 2 and 3) in a second system. The three-phase motor coil 18A in the first system is driven by a motor drive circuit 32A (see FIGS. 2 and 3) in the first system to be discussed later. The three-phase motor coil 18B in the second system is driven by a motor drive circuit 32B (see FIGS. 2 and 3) in the second system to be discussed later.

Hereinafter, the three-phase motor coil 18A in the first system will be occasionally referred to as a first motor coil 18A, and the three-phase motor coil 18B in the second system will be occasionally referred to as a second motor coil 18B. Similarly, the motor drive circuit 32A in the first system will be occasionally referred to as a first motor drive circuit 32A, and the motor drive circuit 32B in the second system will be occasionally referred to as a second motor drive circuit 32B. The electric motor 18 is provided with a rotational angle sensor 23 such as a resolver, for example, configured to detect the rotational angle of a rotor of the electric motor 18. The speed reduction mechanism 19 is composed of a worm gear mechanism that includes a worm shaft 20 and a worm wheel 21 meshed with the worm shaft 20.

The worm shaft 20 is rotationally driven by the electric motor 18. The worm wheel 21 is coupled so as to be rotatable together with the steering shaft 6. The worm wheel 21 is rotationally driven by the worm shaft 20. When the worm shaft 20 is rotationally driven by the electric motor 18, the worm wheel 21 is rotationally driven to rotate the steering shaft 6. Rotation of the steering shaft 6 is transferred to the pinion shaft 13 via the intermediate shaft 7. Rotation of the pinion shaft 13 is converted into movement of the rack shaft 14 in the axial direction. Consequently, the steered wheels 3 are steered. That is, the worm shaft 20 is rotationally driven by the electric motor 18 to enable steering assist by the electric motor 18.

The vehicle is provided with a vehicle speed sensor 24 configured to detect a vehicle speed V. The steering torque T which is detected by the torque sensor 11, the vehicle speed V which is detected by the vehicle speed sensor 24, an output signal from the rotational angle sensor 23, etc. are input to an electronic control unit (ECU) 12. The ECU 12 controls the electric motor 18 on the basis of such input signals.

Figure 2:
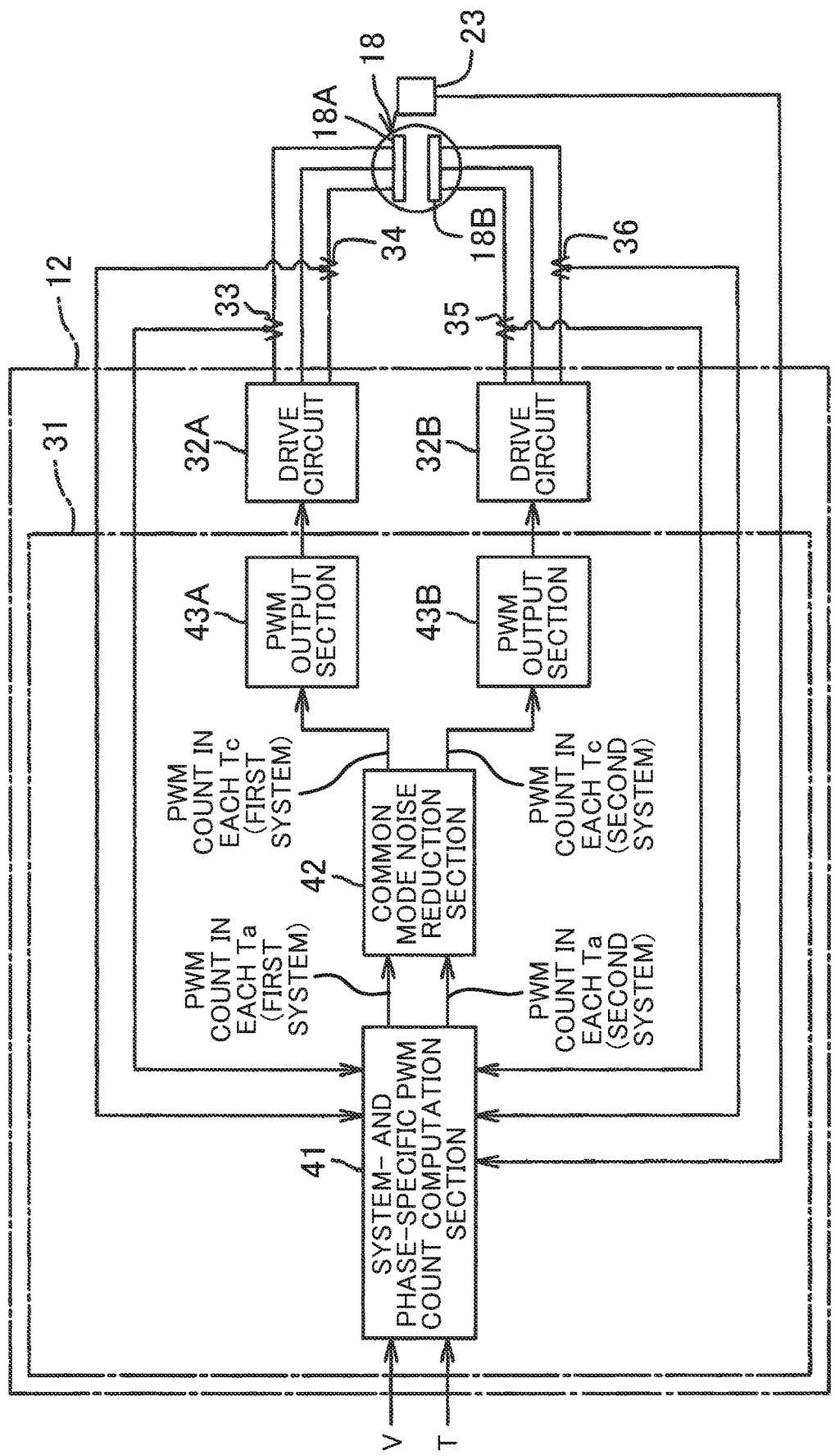
FIG. 2 is a block diagram illustrating the electric configuration of an ECU.

FIG. 2 is a block diagram illustrating the overall electric configuration of the ECU 12. The ECU 12 includes a microcomputer 31, the first motor drive circuit 32A, and the second motor drive circuit 32B. The first motor drive circuit 32A is controlled by the microcomputer 31, and supplies power to the first motor coil 18A of the electric motor 18. The second motor drive circuit 32B is controlled by the microcomputer 31, and supplies power to the second motor coil 18B of the electric motor 18.

Figure 3:
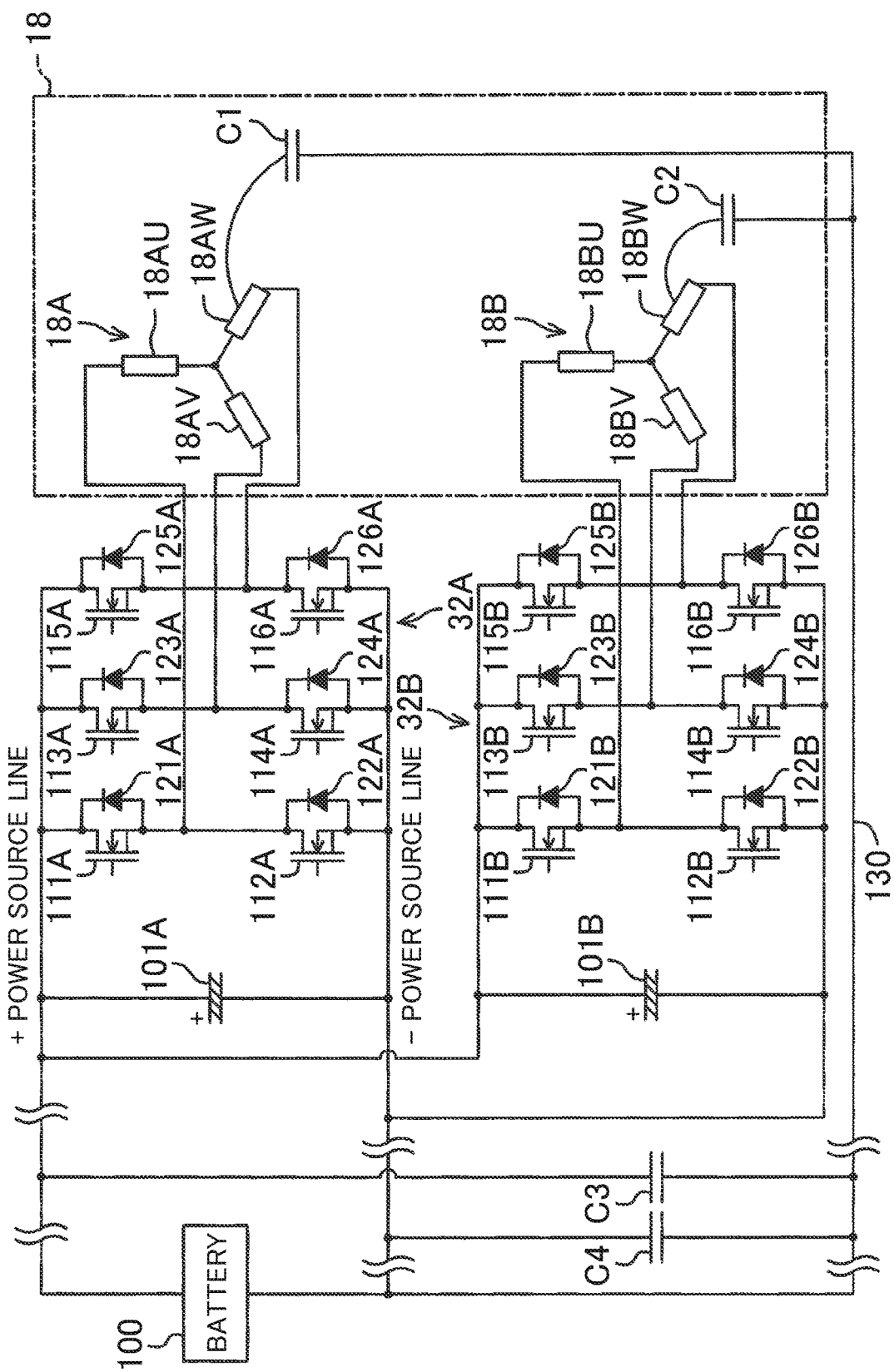
FIG. 3 is an electric circuit diagram mainly illustrating the configuration of a first motor drive circuit and a second motor drive circuit.

FIG. 3 is an electric circuit diagram mainly illustrating the configuration of the first motor drive circuit 32A and the second motor drive circuit 32B. The first motor coil 18A has stator coils 18AU, 18AV, and 18AW for U-phase, V-phase, and W-phase. The second motor coil 18B has stator coils 18BU, 18BV, and 18BW for U-phase, V-phase, and W-phase. The phase difference between the first motor coil 18A and the second motor coil 18B is preferably 0 degrees, 120 degrees, or 240 degrees.

The first motor drive circuit 32A is a three-phase inverter circuit. The first motor drive circuit 32A includes a first smoothing capacitor 101A connected in series with a power source (battery) 100, a plurality of switching elements 111A to 116A, and a plurality of diodes 121A to 126A. The first smoothing capacitor 101A is connected between both terminals of the power source 100. In the embodiment, the switching elements 111A to 116A are each constituted from an n-channel metal oxide semiconductor field effect transistor (MOSFET). Hereinafter, the switching elements 111A to 116A will be occasionally referred to as FETs 111A to 116A.

The plurality of FETs 111A to 116A include an upper FET 111A for U-phase, a lower FET 112A for U-phase connected in series thereto, an upper FET 113A for V-phase, a lower FET 114A for V-phase connected in series thereto, an upper FET 115A for W-phase, and a lower FET 116A for W-phase connected in series thereto. The switching elements 111A to 116A are connected in inverse parallel with the diodes 121A to 126A, respectively.

The drain of the upper FET 111A, 113A, 115A is connected to a positive electrode terminal of the first smoothing capacitor 101A. The source of the upper FET 111A, 113A, 115A is connected to the drain of the lower FET 112A, 114A, 116A, respectively. The source of the lower FET 112A, 114A, 116A is connected to a negative electrode terminal of the first smoothing capacitor 101A.

The point of connection between the upper FET 111A and the lower FET 112A for U-phase is connected to the stator coil 18AU for U-phase of the first motor coil 18A. The point of connection between the upper FET 113A and the lower FET 114A for V-phase is connected to the stator coil 18AV for V-phase of the first motor coil 18A. The point of connection between the upper FET 115A and the lower FET 116A for W-phase is connected to the stator coil 18AW for W-phase of the first motor coil 18A. The FETs 111A to 116A are controlled on the basis of a PWM signal output from a PWM output section 43A (see FIG. 2) in the first system to be discussed later.

The second motor drive circuit 32B is a three-phase inverter circuit. The second motor drive circuit 32B includes a second smoothing capacitor 101B connected in series with the power source (battery) 100, a plurality of switching elements 111B to 116B, and a plurality of diodes 121B to 126B. The second smoothing capacitor 101B is connected between both terminals of the power source 100. In the embodiment, the switching elements 111B to 116B are each constituted from an n-channel MOSFET. Hereinafter, the switching elements 111B to 116B will be occasionally referred to as FETs 111B to 116B.

The plurality of FETs 111B to 116B include an upper FET 111B for U-phase, a lower FET 112B for U-phase connected in series thereto, an upper FET 113B for V-phase, a lower FET 114B for V-phase connected in series thereto, an upper FET 115B for W-phase, and a lower FET 116B for W-phase connected in series thereto. The switching elements 111B to 116B are connected in inverse parallel with the diodes 121B to 126B, respectively.

The drain of the upper FET 111B, 113B, 115B is connected to a positive electrode terminal of the second smoothing capacitor 101B. The source of the upper FET 111B, 113B, 115B is connected to the drain of the lower FET 112B, 114B, 116B, respectively. The source of the lower FET 112B, 114B, 116B is connected to a negative electrode terminal of the second smoothing capacitor 101B.

The point of connection between the upper FET 111B and the lower FET 112B for U-phase is connected to the stator coil 18BU for U-phase of the second motor coil 18B. The point of connection between the upper FET 113B and the lower FET 114B for V-phase is connected to the stator coil 18BV for V-phase of the second motor coil 18B. The point of connection between the upper FET 115B and the lower FET 116B for W-phase is connected to the stator coil 18BW for W-phase of the second motor coil 18B. The FETs 111B to 116B are controlled on the basis of a PWM signal output from a PWM output section 43B (see FIG. 2) in the second system to be discussed later.

In FIG. 3, the power source 100 is mounted on the vehicle. A negative (−) electrode of the power source 100 is electrically connected to a frame (chassis) 130, which is made of metal, of the vehicle. Therefore, the frame 130 is at the same potential as the negative electrode of the power source 100. The electric power steering system 1 on which the electric motor 18 is mounted is attached to the frame 130 by a bolt or the like. The + power source line and the − power source line of the ECU are connected to the positive and negative electrodes, respectively, of the power source 100 through long lines. Therefore, stray capacitances C1 and C2 are present between the first and second motor coils 18A and 18B, respectively, and the frame 130. Stray capacitances C3 and C4 are present between the positive and negative power source lines, respectively, which connect between the power source 100 and the electric power steering system 1 and the frame ground.

Returning to FIG. 2, two current sensors 33 and 34 are provided in power supply lines configured to connect between the first motor drive circuit 32A and the first motor coil 18A. Such current sensors 33 and 34 are provided so as to be able to detect phase currents that flow through two of three power supply lines configured to connect between the first motor drive circuit 32A and the first motor coil 18A.

Similarly, two current sensors 35 and 36 are provided in power supply lines configured to connect between the second motor drive circuit 32B and the second motor coil 18B. Such current sensors 35 and 36 are provided so as to be able to detect phase currents that flow through two of three power supply lines configured to connect between the second motor drive circuit 32B and the second motor coil 18B.

The microcomputer 31 includes a central processing unit (CPU) and a memory (such as a read-only memory (ROM), a random-access memory (RAM), and a non-volatile memory), and executes a predetermined program to function as a plurality of function processing sections. The plurality of function processing sections include a system- and phase-specific PWM count computation section 41, a common mode noise reduction section 42, the PWM output section 43A in the first system, and the PWM output section 43B in the second system. Hereinafter, the PWM output section 43A in the first system will be occasionally referred to as a first PWM output section 43A, and the PWM output section 43B in the second system will be occasionally referred to as a second PWM output section 43B.

Figure 4:
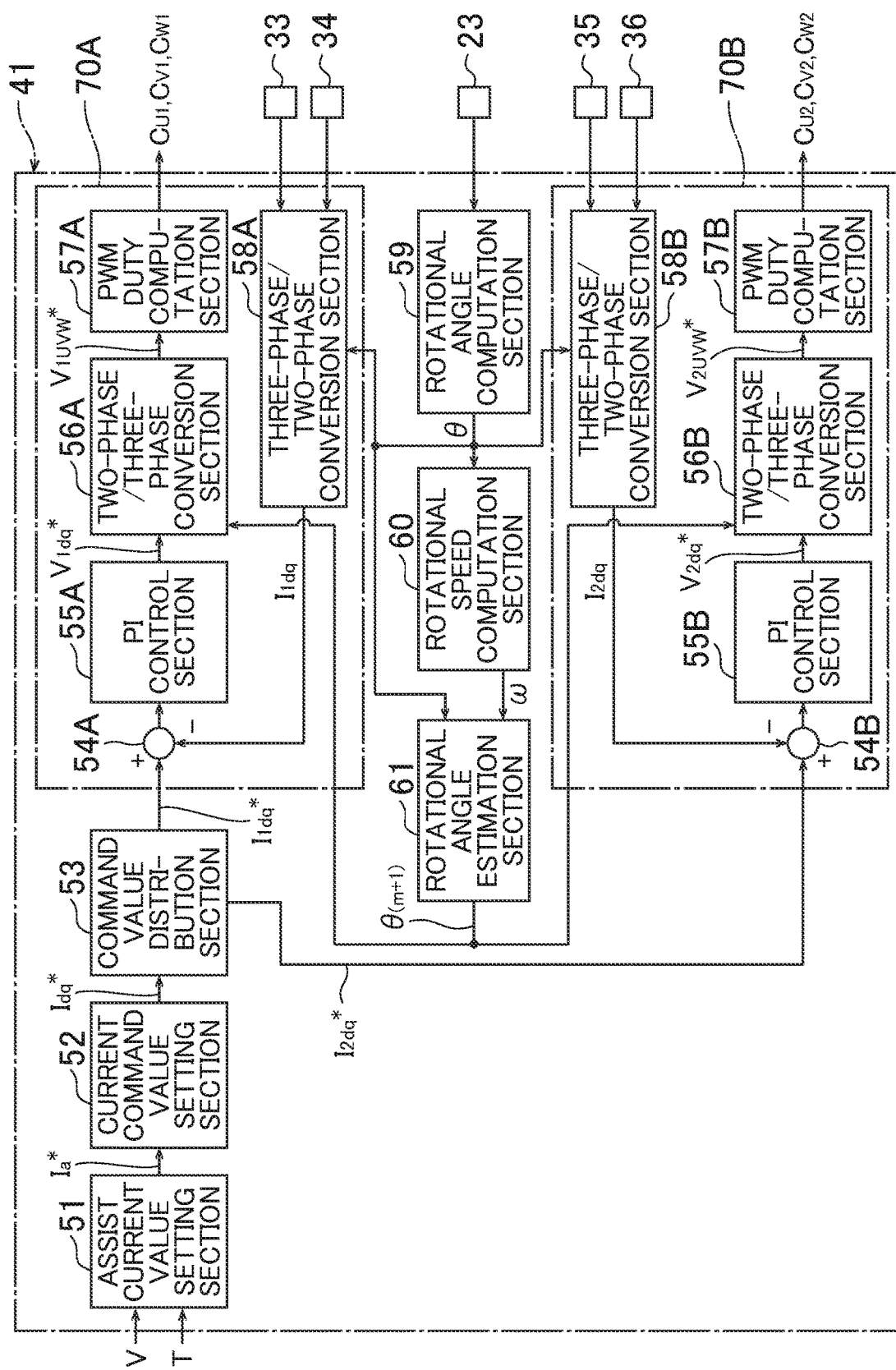
FIG. 4 is a block diagram illustrating the configuration of a system- and phase-specific PWM count computation section.

FIG. 4 is a block diagram illustrating the configuration of the system- and phase-specific PWM count computation section 41. The system- and phase-specific PWM count computation section 41 computes a PWM count in each current control cycle for each phase in each system. The system- and phase-specific PWM count computation section 41 includes an assist current value setting section 51, a current command value setting section 52, a command value distribution section 53, a first system computation section 70A, a second system computation section 70B, a rotational angle computation section 59, a rotational speed computation section 60, and a rotational angle estimation section 61.

The first system computation section 70A includes a first current deviation computation section 54A, a first proportional-integral (PI) control section 55A, a first two-phase/three-phase conversion section 56A, a first PWM duty computation section 57A, and a first three-phase/two-phase conversion section 58A. The second system computation section 70B includes a second current deviation computation section 54B, a second proportional-integral (PI) control section 55B, a second two-phase/three-phase conversion section 56B, a second PWM duty computation section 57B, and a second three-phase/two-phase conversion section 58B.

Figure 5A:
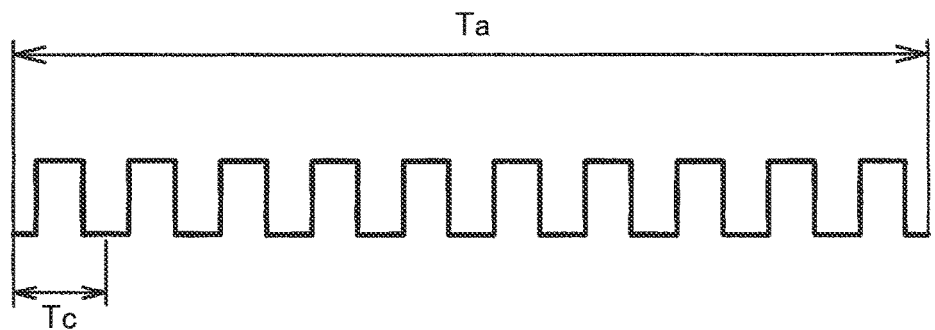
FIG. 5A is a schematic chart illustrating the relationship between a PWM signal cycle Tc and a current control cycle Ta.

As indicated in FIG. 5A, a cycle (hereinafter referred to as a "PWM cycle") Tc of the PWM signal is shorter than a current control cycle Ta. The current control cycle Ta is the computation cycle of the control loop of the motor current. That is, the current control cycle Ta is the computation cycle of blocks included in the first system computation section 70A and the second system computation section 70B in FIG. 4. The current control cycle Ta is determined in consideration of the scale of the program, the computation capacity of the microcomputer 31, etc. In the embodiment, PWM duties are updated by the PWM duty computation sections 57A and 57B at the first timing in the present current control cycle Ta to output updated PWM duties $Cu_1$, $Cv_1$, $Cw_1$, $Cu_2$, $Cv_2$, and $Cw_2$. In the embodiment, Tc is one-tenth of Ta. In other words, each current control cycle Ta includes ten PWM cycles Tc. The first cycle of the ten PWM cycles Tc is occasionally referred to as a first cycle, and the subsequent cycles are occasionally referred to as second, third, . . . , ninth, and tenth cycles. The cycle number of the PWM cycles is occasionally represented by the symbol "i" (i=1, 2, . . . , 9, and 10). The frequency (=1/Tc) of the PWM signal is called a carrier frequency.

Figure 5B:
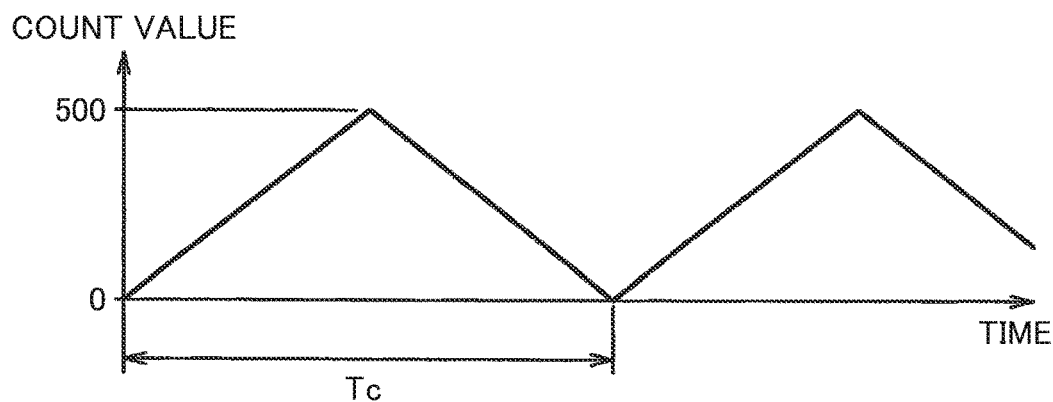
FIG. 5B is a waveform chart illustrating a carrier waveform.

A PWM waveform generation method according to the present embodiment will be described. The clocks of a PWM clock frequency generated by a clock generator (not illustrated) in the microcomputer 31 are counted up and counted down by a counter (not illustrated). The count value of the counter is indicated in FIG. 5B in which the horizontal axis represents the time and the vertical axis represents the count value. The count value is interpreted as an unsigned integer. The count value is occasionally called a carrier count. In the embodiment, the waveform in FIG. 5B is a carrier waveform. The carrier waveform is a triangular waveform. One cycle of the triangular waveform is equal to Tc. The frequency (carrier frequency) of the PWM signal is determined by the maximum value of the carrier waveform, that is, the maximum value of the count value. In the present embodiment, the PWM clock frequency is 100 [MHz], and the frequency (hereinafter referred to as the "PWM frequency") of the PWM signal is set to 100 [kHz]. Therefore, the maximum value of the count value is 100,000,000÷100,000÷2=500. 100,000,000/100,000 is divided by 2 since the clocks are counted up and down.

Figure 5C:
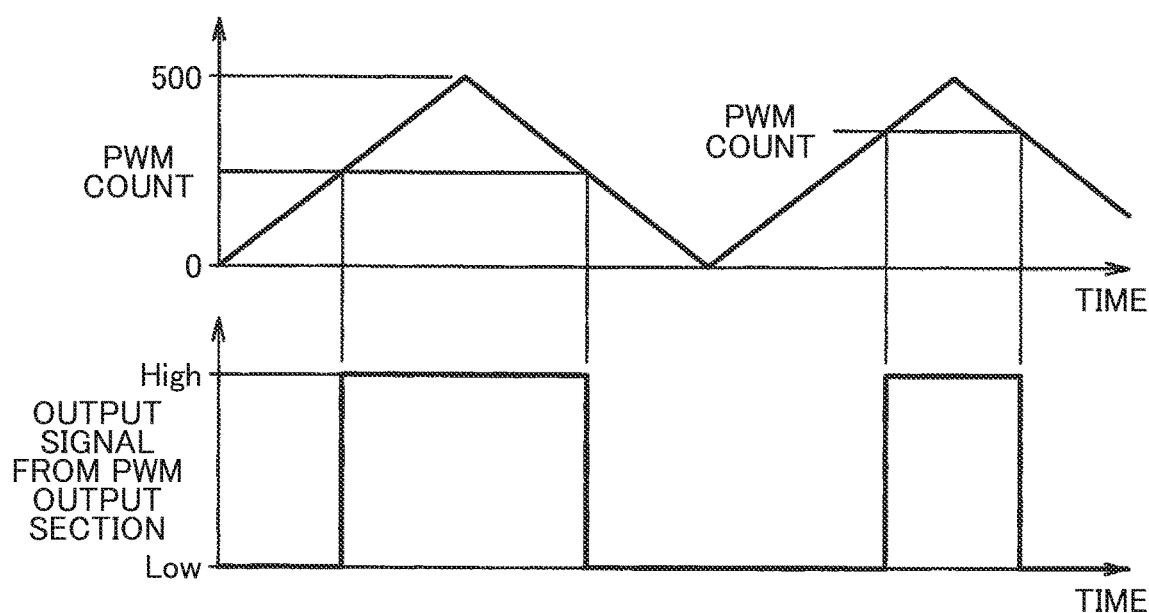
FIG. 5C is a schematic chart illustrating a PWM signal generation method.

As illustrated in FIG. 5C, the PWM output sections 43A and 43B (see FIG. 2) compare a given PWM count and the count value of the counter, and output a High signal or a Low signal to the motor drive circuits 32A and 32B (see FIG. 2), respectively. The PWM output sections 43A and 43B output a High signal (or a Low signal) while the count value of the counter is equal to or more than the PWM count, and output a Low signal (or a High signal) otherwise, for example. The High signal and the Low signal are used as the PWM signal.

In the embodiment, the following two patterns are provided as variation patterns (on/off patterns) of the on/off state of the upper FETs and the lower FETs in the PWM cycle Tc.

First on/off pattern: a pattern in which the on/off state is varied, from the start of the carrier count, in the order of upper FET on state→lower FET on state→upper FET on state Second on/off pattern: a pattern in which the on/off state is varied, from the start of the carrier count, in the order of lower FET on state→upper FET on state→lower FET on state In the embodiment, in each system, the upper and lower FETs for two of U-phase, V-phase, and W-phase are controlled in accordance with the same pattern that is one of the first on/off pattern and the second on/off pattern, and the upper and lower FETs for the one remaining phase are controlled in accordance with the other on/off pattern. In the embodiment, in the first system, the upper and lower FETs for two of U-phase, V-phase, and W-phase are controlled in accordance with the first on/off pattern, and the upper and lower FETs for the one remaining phase are controlled in accordance with the second on/off pattern. In the second system, on the other hand, the upper and lower FETs for two of U-phase, V-phase, and W-phase are controlled in accordance with the second on/off pattern, and the upper and lower FETs for the one remaining phase are controlled in accordance with the first on/off pattern.

In each system, one of the two phases, the upper and lower FETs for which are controlled in accordance with the same on/off pattern, will be occasionally referred to as A-phase, the other of two such phases will be occasionally referred to as B-phase, and the one remaining phase will be occasionally referred to as C-phase. In the first system, the upper and lower FETs for A-phase and B-phase are controlled in accordance with the first on/off pattern, and the upper and lower FETs for C-phase are controlled in accordance with the second on/off pattern. In the second system, in contrast, the upper and lower FETs for A-phase and B-phase are controlled in accordance with the second on/off pattern, and the upper and lower FETs for C-phase are controlled in accordance with the first on/off pattern.

Returning to FIG. 4, the rotational angle computation section 59 computes a rotational angle θ (electrical angle) of the rotor of the electric motor 18 on the basis of an output signal from the rotational angle sensor 23 in each current control cycle Ta. The rotor rotational angle θ, which is computed by the rotational angle computation section 59, is provided to the first and second three-phase/two-phase conversion sections 58A and 58B, the rotational speed computation section 60, and the rotational angle estimation section 61. In the embodiment, the rotor rotational angle θ is acquired (detected) at the timing at the middle of the current control cycle Ta.

The rotational speed computation section 60 computes a rotational speed (angular velocity) ω of the rotor of the electric motor 18 by differentiating the rotor rotational angle θ, which is computed by the rotational angle computation section 59, with respect to time. The rotational speed co, which is computed by the rotational speed computation section 60, is provided to the rotational angle estimation section 61. The rotational angle estimation section 61 estimates a rotor rotational angle $\theta_{(m+1)}$ at the middle of the next current control cycle Ta on the basis of the following formula (1) using the rotor rotational angle $\theta_{(m-1)}$ at the middle of the previous current control cycle Ta, which is acquired in the previous current control cycle Ta.

$$\theta_{(m+1)}=\theta_{(m-1)}+\omega \cdot 2Ta \qquad (1)$$

Figure 6:
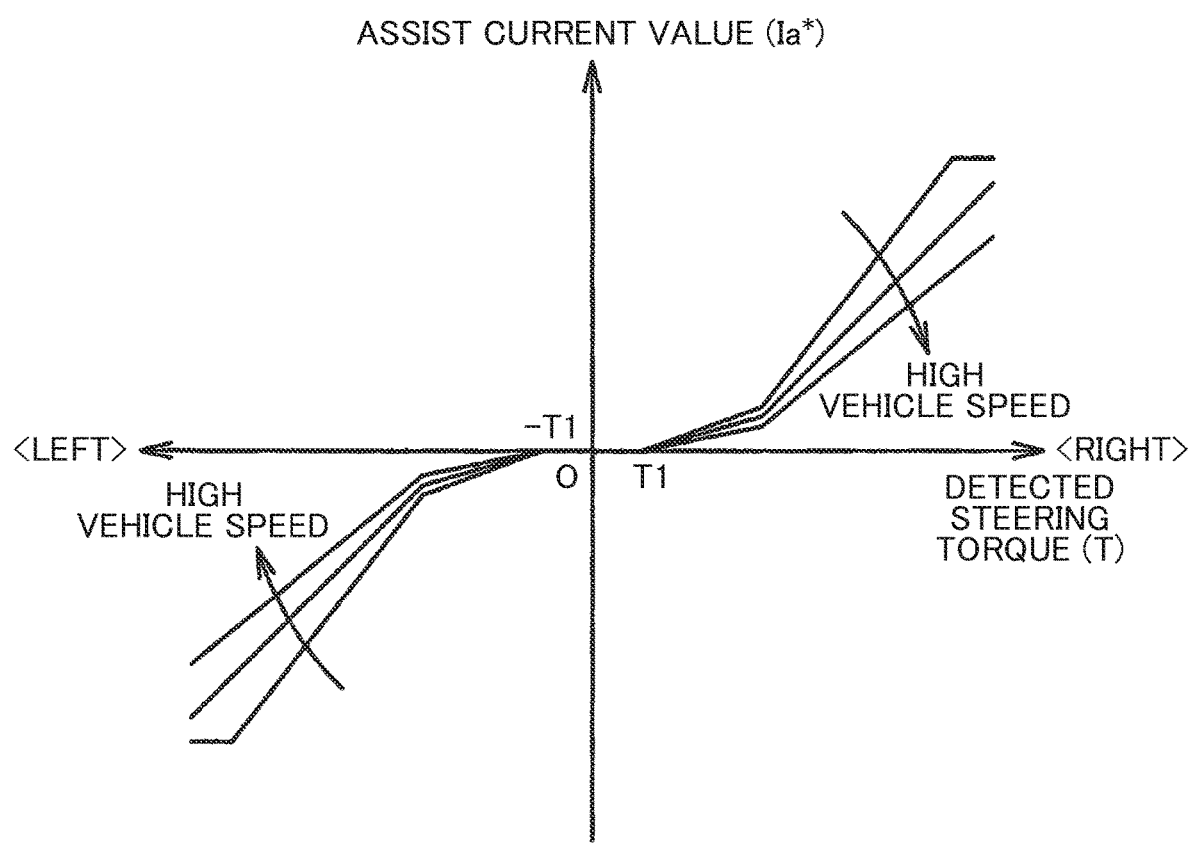
FIG. 6 is a graph illustrating an example of an assist current value Ia* set with respect to detected steering torque T.

The rotor rotational angle $\theta_{(m+1)}$ in the next current control cycle Ta, which is estimated by the rotational angle estimation section 61, is provided to the first and second two-phase/three-phase conversion sections 56A and 56B. The assist current value setting section 51 sets an assist current value Ia* in each current control cycle Ta on the basis of the detected steering torque T, which is detected by the torque sensor 11, and the vehicle speed V, which is detected by the vehicle speed sensor 24. An example of the assist current value Ia* which is set with respect to the detected steering torque T is illustrated in FIG. 6. The detected steering torque T has a positive value when the torque is applied to steer the vehicle to the right, and a negative value when the torque is applied to steer the vehicle to the left, for example. The assist current value Ia* has a positive value when the electric motor 18 should generate a steering assist force for steering the vehicle to the right, and a negative value when the electric motor 18 should generate a steering assist force for steering the vehicle to the left. The assist current value Ia* becomes positive when the detected steering torque T has a positive value, and becomes negative when the detected steering torque T has a negative value.

When the detected steering torque T has a very small value in the range (torque dead band) of −T1 to T1 (e.g. T1=0.4 N·m), the assist current value Ia* is set to zero. In the case where the detected steering torque T has a value outside the range of −T1 to T1, the assist current value Ia* is set such that the absolute value thereof becomes larger as the absolute value of the detected steering torque T becomes larger. The assist current value Ia* is also set such that the absolute value thereof becomes smaller as the vehicle speed V, which is detected by the vehicle speed sensor 24, becomes higher. Consequently, a large assist force is generated during low-speed travel, and a small assist force is generated during high-speed travel.

The current command value setting section 52 sets the values of currents that should flow on the coordinate axes of a dq coordinate system as current command values on the basis of the assist current value Ia*, which is set by the assist current value setting section 51. Specifically, the current command value setting section 52 sets a d-axis current command value $I_d^*$ and a q-axis current command value (which will hereinafter be referred to collectively as "two-phase current command values $I_{dq}^*$"). Further specifically, the current command value setting section 52 sets the q-axis current command value $I_q^*$ to the assist current value Ia*, which is set by the assist current value setting section 51, and sets the d-axis current command value $I_d^*$ to zero. The two-phase current command values $I_{dq}^*$, which are set by the current command value setting section 52, are provided to the command value distribution section 53.

The command value distribution section 53 distributes the two-phase current command values $I_{dq}^*$ to the first system computation section 70A and the second system computation section 70B. In the embodiment, the command value distribution section 53 distributes half the two-phase current command values $I_{dq}^*$ to each of the first system computation section 70A and the second system computation section 70B. That is, in the embodiment, both the rate of distribution of the two-phase current command values $I_{dq}^*$ to the first system computation section 70A and the rate of distribution of the two-phase current command values $I_{dq}^*$ to the second system computation section 70B are 50%. The two-phase current command values distributed to the first system computation section 70A are referred to as first two-phase current command values $I_{1dp}^*$. The first two-phase current command values $I_{1dq}^*$ include a first d-axis current command value $I_{1d}^*$ and a first q-axis current command value $I_{1q}^*$. The two-phase current command values distributed to the second system computation section 70B are referred to as second two-phase current command values $I_{2dp}^*$. The second two-phase current command values $I_{2dq}^*$ include a second d-axis current command value $I_{2d}^*$ and a second q-axis current command value $I_{2q}^*$.

Next, the first system computation section 70A will be described. The first three-phase/two-phase conversion section 58A first computes a U-phase current $I_{1U}$, a V-phase current $I_{1V}$, and a W-phase current $I_{1W}$ (which will hereinafter be referred to collectively as "detected three-phase currents $I_{1UVW}$") in the first system from the phase currents for two phases, which are detected by the current sensors 33 and 34. Then, the first three-phase/two-phase conversion section 58A performs a coordinate conversion on the detected three-phase currents $I_{1UVW}$ for the UVW coordinate system in the first system into detected two-phase currents $I_{1dq}$ for the dq coordinate system in the first system. The detected two-phase currents $I_{1dq}$ in the first system include a first detected d-axis current $I_{1d}$ and a first detected q-axis current $I_{1q}$. The rotor rotational angle θ, which is computed by the rotational angle computation section 59, is used in the coordinate conversion.

The first current deviation computation section 54A computes a deviation of the first detected d-axis current $I_{1d}$ from the first d-axis current command value $I_{1d}^*$ and a deviation of the first detected q-axis current $I_{1q}$ from the first q-axis current command value $I_{1q}^*$. Such deviations are provided to the first PI control section 55A. The first PI control section 55A performs a PI computation on the current deviations, which are computed by the first current deviation computation section 54A, to generate first two-phase voltage command values $V_{1dq}^*$ (a first d-axis voltage command value $V_{1d}^*$ and a first q-axis voltage command value $V_{1q}^*$) to be applied to the first motor coil 18A. The first two-phase voltage command values $V_{1dq}^*$ are provided to the first two-phase/three-phase conversion section 56A.

The first two-phase/three-phase conversion section 56A performs a two-phase/three-phase conversion on the first two-phase voltage command values $V_{1dq}^*$, which are computed by the first PI control section 55A in the present current control cycle Ta, using an estimated rotational angle value $θ_{(m+1)}$ for the next current control cycle Ta, which is computed by the rotational angle estimation section 61 in the present current control cycle Ta, to compute first three-phase voltage command values $V_{1UVW}^*$ for the next current control cycle Ta. The first three-phase voltage command values $V_{1UVW}^*$ include a first U-phase voltage command value $V_{1U}^*$, a first V-phase voltage command value $V_{1V}^*$, and a first W-phase voltage command value $V_{1W}^*$. Consequently, the first three-phase voltage command values $V_{1UVW}^*$ for the next current control cycle Ta are obtained.

The first three-phase voltage command values $V_{1UVW}^*$ for the next current control cycle Ta, which are obtained by the first two-phase/three-phase conversion section 56A, are provided to the first PWM duty computation section 57A. The first PWM duty computation section 57A generates a first U-phase PWM count (PWM duty) $Cu_1$, a first V-phase PWM count $Cv_1$, and a first W-phase PWM count $Cw_1$ for the next current control cycle Ta on the basis of the first three-phase voltage command values $V_{1UVW}^*$ for the next current control cycle Ta, and provides such counts to the common mode noise reduction section 42 (see FIG. 2).

The first U-phase PWM count $Cu_1$, the upper and lower FETs for which are controlled in accordance with the first on/off pattern, is calculated as follows. That is, the first PWM duty computation section 57A computes the first U-phase PWM count $Cu_1$ for a certain current control cycle Ta on the basis of the following formula (2) using the first U-phase voltage command value $V_{1U}^*$ for the relevant current control cycle Ta, which is obtained by the first two-phase/three-phase conversion section 56A, and the maximum value (in the example, 500) of the PWM count.

$$Cu_1 = V_{1U}^* \times (\text{maximum value of } PWM \text{ count}/Vb) \quad (2)$$
$$= V_{1U}^* \times (500/Vb)$$

In the formula (2), Vb is the power source voltage for the first motor drive circuit 32A (output voltage of the power source 100). The first V-phase PWM count $Cv_1$, the upper and lower FETs for which are controlled in accordance with the first on/off pattern, can be computed by using the first V-phase voltage command value $V_{1V}^*$ in place of the first U-phase voltage command value $V_{1U}^*$ on the right side of the formula (2).

The first W-phase PWM count $Cw_1$, the upper and lower FETs for which are controlled in accordance with the second on/off pattern, is calculated as follows. That is, the first PWM duty computation section 57A computes the first W-phase PWM count $Cw_1$ for a certain current control cycle Ta on the basis of the following formula (3) using the first W-phase voltage command value $V_{1W}^*$ for the relevant current control cycle Ta, which is obtained by the first two-phase/three-phase conversion section 56A, and the maximum value (in the example, 500) of the PWM count.

$$Cw_1 = \text{maximum value of } PWM \text{ count} - \{V_{1W}^* \times (\text{maximum value of } \quad (3)$$
$$PWM \text{ count}/Vb)\}$$
$$= 500 - \{V_{1W}^* \times (500/Vb)\}$$

In the formula (3), Vb is the power source voltage for the first motor drive circuit 32A (output voltage of the power source 100). Next, the second system computation section 70B will be described. The second three-phase/two-phase conversion section 58B first computes a U-phase current $I_{2U}$, a V-phase current $I_{2V}$, and a W-phase current $I_{2W}$ (which will hereinafter be referred to collectively as "detected three-phase currents $I_{2UVW}$") in the second system from the phase currents for two phases, which are detected by the current sensors 35 and 36. Then, the second three-phase/two-phase conversion section 58B performs a coordinate conversion on the detected three-phase currents $I_{2UVW}$ for the UVW coordinate system in the second system into detected two-phase currents $I_{2dq}$ for the dq coordinate system in the second system. The detected two-phase currents $I_{2dq}$ in the second system include a second detected d-axis current $I_{2d}$ and a second detected q-axis current $I_{2q}$. The rotor rotational angle θ, which is computed by the rotational angle computation section 59, is used in the coordinate conversion.

The second current deviation computation section 54B computes a deviation of the second detected d-axis current $I_{2d}$ from the second d-axis current command value $I_{2d}^*$ and a deviation of the second detected q-axis current $I_{2q}$ from the second q-axis current command value $I_{2q}^*$. Such deviations are provided to the second PI control section 55B. The second PI control section 55B performs a PI computation on the current deviations, which are computed by the second current deviation computation section 54B. Consequently, second two-phase voltage command values $V_{2dq}^*$ (a second d-axis voltage command value $V_{2d}^*$ and a second q-axis voltage command value $V_{2q}^*$) to be applied to the second motor coil 18B are generated. The second two-phase voltage command values $V_{2dq}^*$ are provided to the second two-phase/three-phase conversion section 56B.

The second two-phase/three-phase conversion section 56B performs a two-phase/three-phase conversion on the second two-phase voltage command values $V_{2dq}^*$, which are computed by the second PI control section 55B in the present current control cycle Ta, using an estimated rotational angle value $θ_{(m+1)}$ for the next current control cycle Ta, which is computed by the rotational angle estimation section 61 in the present current control cycle Ta. Consequently, second three-phase voltage command values $V_{2UVW}^*$ for the next current control cycle Ta are computed. The second three-phase voltage command values $V_{2UVW}^*$ include a second U-phase voltage command value $V_{2U}^*$, a second V-phase voltage command value $V_{2V}^*$, and a second W-phase voltage command value $V_{2W}^*$. Consequently, the second three-phase voltage command values $V_{2UVW}^*$ for the next current control cycle Ta are obtained.

The second three-phase voltage command values $V_{2UVW}^*$ for the next current control cycle Ta, which are obtained by the second two-phase/three-phase conversion section 56B, are provided to the second PWM duty computation section 57B. The second PWM duty computation section 57B generates a second U-phase PWM count (PWM duty) $Cu_2$, a second V-phase PWM count $Cv_2$, and a second W-phase PWM count $Cw_t$ for the next current control cycle Ta on the basis of the second three-phase voltage command values $V_{2UVW}^*$ for the next current control cycle Ta, and provides such counts to the common mode noise reduction section 42 (see FIG. 2).

The second U-phase PWM count $Cu_2$, the upper and lower FETs for which are controlled in accordance with the first on/off pattern, is calculated as follows. That is, the second PWM duty computation section 57B computes the second U-phase PWM count $Cu_2$ for a certain current control cycle Ta on the basis of the following formula (4) using the second U-phase voltage command value $V_{2U}^*$ for the relevant current control cycle Ta, which is obtained by the second two-phase/three-phase conversion section 56B, and the maximum value (in the example, 500) of the PWM count.

$$Cu_2 = V_{2U}^* \times (\text{maximum value of } PWM \text{ count}/Vb) \quad (4)$$
$$= V_{2U}^* \times (500/Vb)$$

In the formula (4), Vb is the power source voltage for the second motor drive circuit 32B (output voltage of the power source 100). The second V-phase PWM count $Cv_2$, the upper and lower FETs for which are controlled in accordance with the second on/off pattern, is calculated as follows. That is, the second PWM duty computation section 57B computes the second V-phase PWM count $Cv_2$ for a certain current control cycle Ta on the basis of the following formula (5) using the second V-phase voltage command value $V_{2V}^*$ for the relevant current control cycle Ta, which is obtained by the second two-phase/three-phase conversion section 56B, and the maximum value (in the example, 500) of the PWM count.

$$Cv_2 = \text{maximum value of } PWM \text{ count} - V_{2V}^* \times (\text{maximum value of} \quad (5)$$
$$PWM \text{ count}/Vb)\}$$
$$= 500 - \{V_{2V}^* \times (500/Vb)\}$$

The second W-phase PWM count $Cw_2$, the upper and lower FETs for which are controlled in accordance with the second on/off pattern, can be computed by using the second W-phase voltage command value $V_{2W}^*$ in place of the second V-phase voltage command value $V_{2V}^*$ on the right side of the formula (5).

The common mode noise reduction section 42 cancels out, in the first system, a part of a noise current generated by turning on and off of the switching element for at least one phase in the first motor drive circuit 32A with a part of a noise current generated by turning on and off of the switching element for a different phase. Consequently, common mode noise can be reduced. In addition, the common mode noise reduction section 42 cancels out, in the second system, a part of a noise current generated by turning on and off of the switching element for at least one phase in the second motor drive circuit 32B with a part of a noise current generated by turning on and off of the switching element for a different phase. Consequently, common mode noise can be reduced. In the case where the two systems have a phase, a noise current for which cannot be canceled out within the system, further, the common mode noise reduction section 42 at least partially cancels out noise currents generated for such phases in the two systems with each other. Consequently, common mode noise can be reduced.

The common mode noise reduction section 42 performs a process (noise reduction process) for reducing common mode noise on the first and second U-phase PWM counts $Cu_1$ and $Cu_2$, V-phase PWM counts $Cv_1$ and $Cv_2$, and W-phase PWM counts $Cw_1$ and $Cw_2$ for the next current control cycle Ta, which are provided from the first and second PWM duty computation sections 57A and 57B. Consequently, the first U-phase PWM count, V-phase PWM count, and W-phase PWM count for each PWM cycle Tc in the next current control cycle Ta and the second U-phase PWM count, V-phase PWM count, and W-phase PWM count for each PWM cycle Tc in the next current control cycle Ta are obtained. Operation of the common mode noise reduction section 42 will be discussed in detail later.

The first U-phase PWM count, V-phase PWM count, and W-phase PWM count for each PWM cycle Tc in the next current control cycle Ta after being subjected to the noise reduction process, which is performed by the common mode noise reduction section 42, are provided to the first PWM output section 43A. On the other hand, the second U-phase PWM count, V-phase PWM count, and W-phase PWM count for each PWM cycle Tc in the next current control cycle Ta after being subjected to the noise reduction process, which is performed by the common mode noise reduction section 42, are provided to the second PWM output section 43B.

The first PWM output section 43A stores the first U-phase PWM count, V-phase PWM count, and W-phase PWM count for each PWM cycle Tc in the current control cycle Ta, which are provided from the common mode noise reduction section 42, for a plurality of current control cycles. The first PWM output section 43A generates first U-phase PWM signal, V-phase PWM signal, and W-phase PWM signal for each PWM cycle Tc in the present current control cycle Ta on the basis of the first U-phase PWM count, V-phase PWM count, and W-phase PWM count for each PWM cycle Tc in the present current control cycle Ta, which are provided from the common mode noise reduction section 42 in the previous current control cycle Ta, and supplies such signals to the first motor drive circuit 32A. Specifically, the first PWM output section 43A generates, for each PWM cycle Tc in the present current control cycle Ta, U-phase PWM signal, V-phase PWM signal, and W-phase PWM signal with a duty corresponding to the first U-phase PWM count, V-phase PWM count, and W-phase PWM count, respectively, for each PWM cycle Tc in the relevant current control cycle Ta, and supplies such signals to the first motor drive circuit 32A.

The six FETs 111A to 116A, which constitute the first motor drive circuit 32A, are controlled in accordance with the PWM signals, which are provided from the first PWM output section 43A. Consequently, a voltage corresponding to the first three-phase voltage command values $V_{1UVW}^*$ for each PWM cycle Tc is applied to the stator coils 18AU, 18AV, and 18AW for respective phases of the first motor coil 18A. The first current deviation computation section 54A and the first PI control section 55A constitute a current feedback control unit. A motor current that flows through the first motor coil 18A is controlled so as to become closer to the first two-phase current command values $I_{1dq}*$, which are distributed to the first system computation section 70A by the command value distribution section 53, through operation of the current feedback control unit.

The second PWM output section 43B stores the second U-phase PWM count, V-phase PWM count, and W-phase PWM count for each PWM cycle Tc in the current control cycle Ta, which are provided from the common mode noise reduction section 42, for a plurality of current control cycles. The second PWM output section 43B generates second U-phase PWM signal, V-phase PWM signal, and W-phase PWM signal for each PWM cycle Tc in the present current control cycle Ta on the basis of the second U-phase PWM count, V-phase PWM count, and W-phase PWM count for each PWM cycle Tc in the present current control cycle Ta, which are provided from the common mode noise reduction section 42 in the previous current control cycle Ta, and supplies such signals to the second motor drive circuit 32B. Specifically, the second PWM output section 43B generates, for each PWM cycle Tc in the present current control cycle Ta, U-phase PWM signal, V-phase PWM signal, and W-phase PWM signal with a duty corresponding to the second U-phase PWM count, V-phase PWM count, and W-phase PWM count, respectively, for each PWM cycle Tc in the relevant current control cycle Ta, and supplies such signals to the second motor drive circuit 32B.

The six FETs 111B to 116B, which constitute the second motor drive circuit 32B, are controlled in accordance with the PWM signals, which are provided from the second PWM output section 43B. Consequently, a voltage corresponding to the second three-phase voltage command values $V_{2UVW}*$ for each PWM cycle Tc is applied to the stator coils 18BU, 18BV, and 18BW for respective phases of the second motor coil 18B. The second current deviation computation section 54B and the second PI control section 55B constitute a current feedback control unit. A motor current that flows through the second motor coil 18B is controlled so as to become closer to the second two-phase current command values $I_{2dq}*$, which are distributed to the second system computation section 70B by the command value distribution section 53, through operation of the current feedback control unit.

The common mode noise reduction section 42 will be described in detail below. First, the basic idea of the common mode noise reduction which is performed by the common mode noise reduction section 42 will be described with reference to FIG. 7. In the case where the waveform of an output voltage (first V-phase voltage) for V-phase in the first system is as indicated in FIG. 7, a current in the − direction flows through the stray capacitance C1 (see FIG. 3) at the time of fall t2 of the first V-phase voltage, and a current in the + direction flows through the stray capacitance C1 at the time of rise t5 of the first V-phase voltage.

Figure 7:
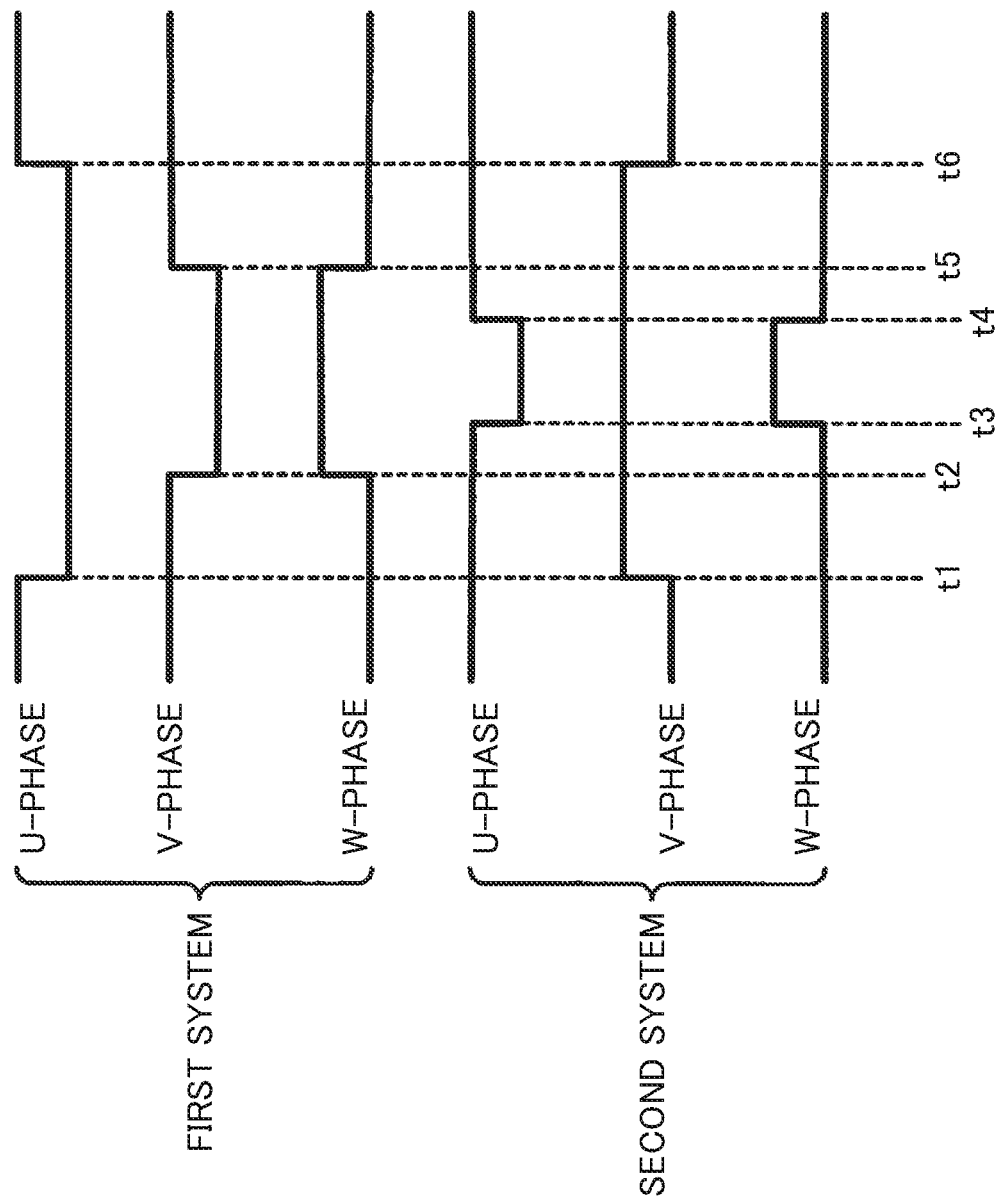
FIG. 7 illustrates the basic idea of a common mode noise reduction performed by a common mode noise reduction section.

Thus, when the waveform of an output voltage (first W-phase voltage) for W-phase in the first system is an inverted version of the waveform of the first V-phase voltage as indicated in FIG. 7, a current in the + direction flows through the stray capacitance C1 at the time of rise t2 of the first W-phase voltage, and a current in the − direction flows through the stray capacitance C1 at the time of fall t5 of the first W-phase voltage. Thus, the current which flows through the stray capacitance C1 because of the first V-phase voltage and the current which flows through the stray capacitance C1 because of the first W-phase voltage cancel out each other at each of the time t2 and the time t5. Therefore, the currents which flow through the stray capacitances C3 and C4 (see FIG. 3), which are present between the positive and negative power source lines and the frame ground, respectively, are reduced.

Similarly, in the case where the waveform of an output voltage (second U-phase voltage) for U-phase in the second system is as indicated in FIG. 7, a current in the − direction flows through the stray capacitance C2 (see FIG. 3) at the time of fall t3 of the second U-phase voltage, and a current in the + direction flows through the stray capacitance C2 at the time of rise t4 of the second U-phase voltage. Thus, when the waveform of an output voltage (second W-phase voltage) for W-phase in the second system is an inverted version of the waveform of the second U-phase voltage as indicated in FIG. 7, a current in the + direction flows through the stray capacitance C2 at the time of rise t3 of the second W-phase voltage, and a current in the − direction flows through the stray capacitance C2 at the time of fall t4 of the second W-phase voltage. Thus, the current which flows through the stray capacitance C2 because of the second U-phase voltage and the current which flows through the stray capacitance C2 because of the second W-phase voltage cancel out each other at each of the time t3 and the time t4. Therefore, the currents which flow through the stray capacitances C3 and C4, which are present between the positive and negative power source lines and the frame ground, respectively, are reduced.

In the case where the waveform of an output voltage (first U-phase voltage) for U-phase in the first system is as indicated in FIG. 7, a current in the − direction flows through the stray capacitance C1 at the time of fall t1 of the first U-phase voltage, and a current in the + direction flows through the stray capacitance C1 at the time of rise t6 of the first U-phase voltage. When the waveform of an output voltage (second V-phase voltage) for V-phase in the second system is an inverted version of the waveform of the first U-phase voltage as indicated in FIG. 7, a current in the + direction flows through the stray capacitance C2 at the time of rise t1 of the second V-phase voltage, and a current in the − direction flows through the stray capacitance C2 at the time of fall t6 of the second V-phase voltage. Thus, the current which flows through the stray capacitance C1 because of the first U-phase voltage and the current which flows through the stray capacitance C2 because of the second V-phase voltage cancel out each other at each of the time t1 and the time t6. Therefore, the currents which flow through the stray capacitances C3 and C4 (see FIG. 3), which are present between the positive and negative power source lines and the frame ground, respectively, are reduced.

Figure 8A:
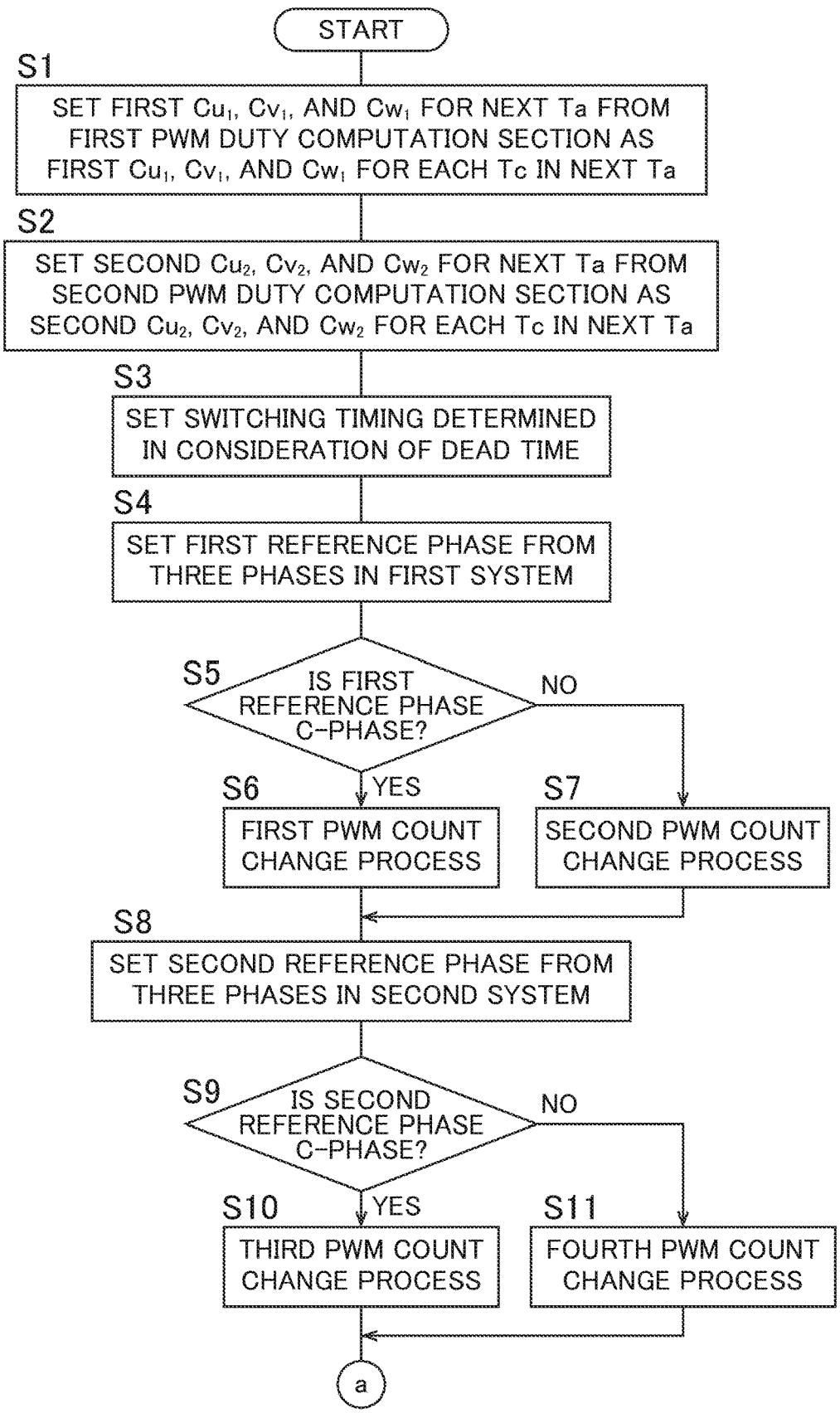
FIG. 8A is a part of a flowchart illustrating an example of operation of the common mode noise reduction section.
Figure 8B:
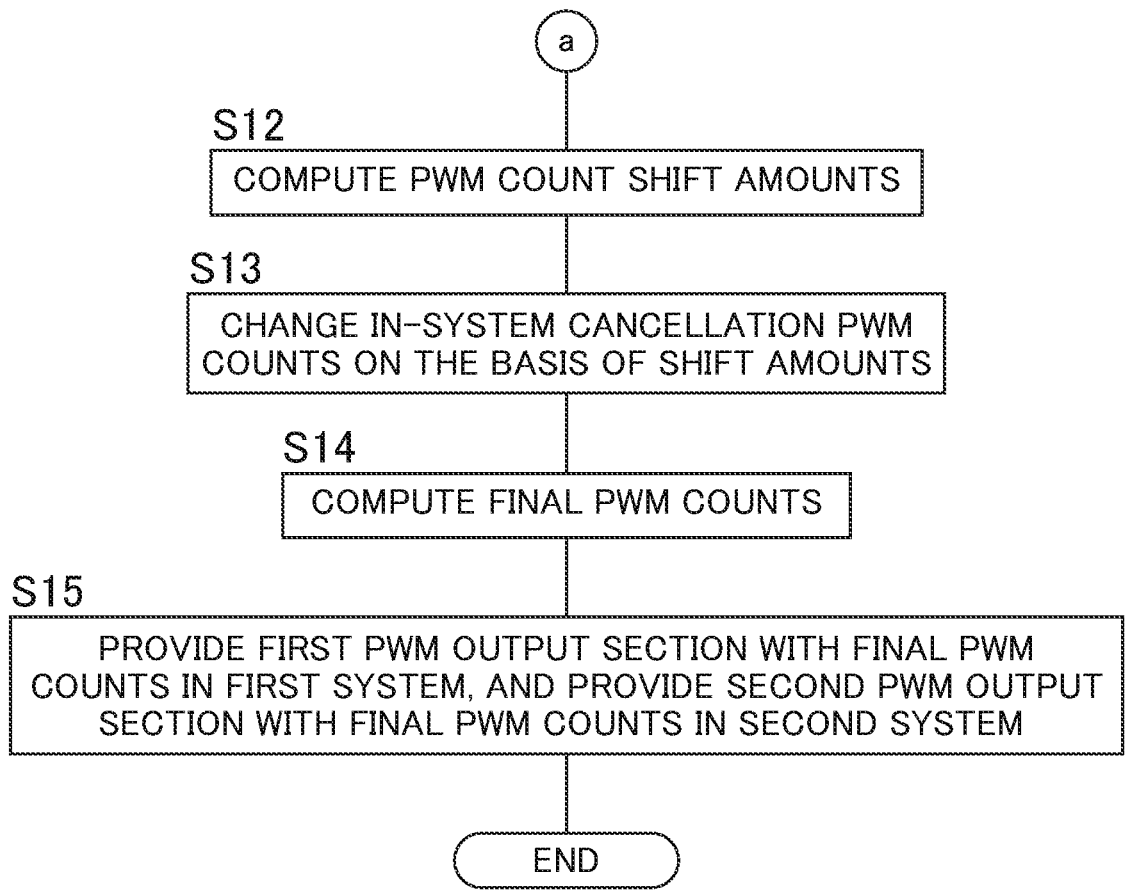
FIG. 8B is a part of a flowchart illustrating an example of operation of the common mode noise reduction section.

FIGS. 8A and 8B are each a flowchart illustrating an example of operation of the common mode noise reduction section. The common mode noise reduction section 42 (see FIG. 2) first sets the first U-phase, V-phase, and W-phase PWM counts $Cu_1$, $Cv_1$, and $Cw_1$ for the next current control cycle Ta, which are provided from the first PWM duty computation section 57A (see FIG. 4), as the first U-phase, V-phase, and W-phase PWM counts $Cu_1$, $Cv_1$, and $Cw_1$ for each PWM cycle Tc in the next current control cycle Ta (step S1).

Similarly, the common mode noise reduction section 42 sets the second U-phase, V-phase, and W-phase PWM counts $Cu_2$, $Cv_2$, and $Cw_2$ for the next current control cycle Ta, which are provided from the second PWM duty computation section 57B, as the second U-phase, V-phase, and W-phase PWM counts $Cu_2$, $Cv_2$, and $Cw_2$ for each PWM cycle Tc in the next current control cycle Ta (step S2).

FIG. 11A is a schematic table illustrating an example of the first U-phase, V-phase, and W-phase PWM counts $Cu_1$, $Cv_1$, and $Cw_1$ for each PWM cycle Tc in the current control cycle Ta, which are set in step S1, and the second U-phase, V-phase, and W-phase PWM counts $Cu_2$, $Cv_2$, and $Cw_2$ for each PWM cycle Tc in the current control cycle Ta, which are set in step S2. Next, the common mode noise reduction section 42 sets a switching timing determined in consideration of the dead time for each phase in each system (step S3).

Figure 9:
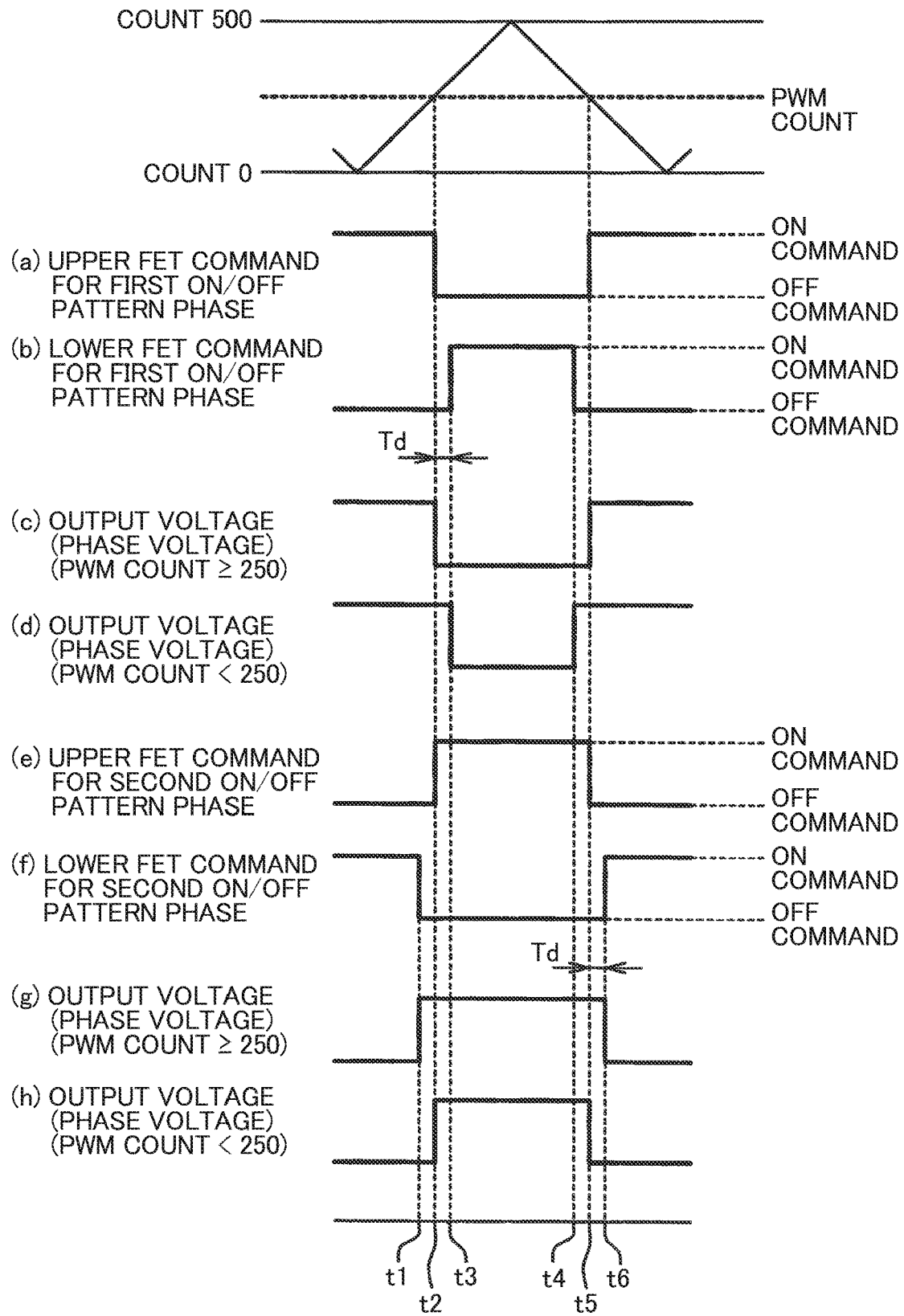
FIG. 9 is a schematic chart mainly illustrating the relationship between a PWM count and an upper FET command and a lower FET command for each phase in each system.

FIG. 9 is a schematic chart mainly illustrating the relationship between a PWM count and an upper FET command and a lower FET command for each phase in each system. In other words, FIG. 9 is a schematic chart illustrating an example of operation of the first PWM output section 43A and the second PWM output section 43B (see FIG. 2) for each phase. In the embodiment, as discussed earlier, the carrier waveform is a triangular waveform, and the value that can be output as the PWM count is set to 0 to 500. In the embodiment, the count value corresponding to the dead time is set to 10.

An upper FET command and a lower FET command for U-phase and V-phase in the first system and U-phase in the second system (hereinafter, such phases will be occasionally referred to collectively as "first on/off pattern phases"), the upper and lower FETs for which are controlled in accordance with the first on/off pattern, will be described. In the embodiment, the switching timing of the upper FETs for the first on/off pattern phases is set such that the upper FET command for the first on/off pattern phases is an off command when the carrier count is larger than the PWM count. That is, as indicated in FIG. 9A, the upper FET command is varied from an on command to an off command when the carrier count becomes equal to the PWM count (time t2) while the carrier count is counting up. The upper FET command is varied from an off command to an on command when the carrier count becomes equal to the PWM count (time t5) while the carrier count is counting down.

As indicated in (b) in FIG. 9, when a dead time Td elapses (time t3) from the time t2, the lower FET command is varied from an off command to an on command. The lower FET command is varied from an on command to an off command at the time (time t4) earlier than the time t5 by the dead time Td. An upper FET command and a lower FET command for W-phase in the first system and V-phase and W-phase in the second system (hereinafter, such phases will be occasionally referred to collectively as "second on/off pattern phases"), the upper and lower FETs for which are controlled in accordance with the second on/off pattern, will be described. In the embodiment, the switching timing of the upper FETs for the second on/off pattern phases is set such that the upper FET command for the second on/off pattern phases is an on command when the carrier count is larger than the PWM count. That is, as indicated in (e) in FIG. 9, the upper FET command is varied from an off command to an on command when the carrier count becomes equal to the PWM count (time t2) while the carrier count is counting up. The upper FET command is varied from an on command to an off command when the carrier count becomes equal to the PWM count (time t5) while the carrier count is counting down.

As indicated in (f) in FIG. 9, the lower FET command is varied from an on command to an off command at the time (time t1) earlier than the time t2 by the dead time Td. When the dead time Td elapses (time t6) from the time t5, the lower FET command is varied from an off command to an on command. An output voltage (phase voltage) for a certain phase during a dead time period will be described with reference to FIGS. 10A and 10B. Here, U-phase in the first system will be described as an example. The same description also applies to the remaining two phases in the first system and the phases in the second system.

Figure 10A:
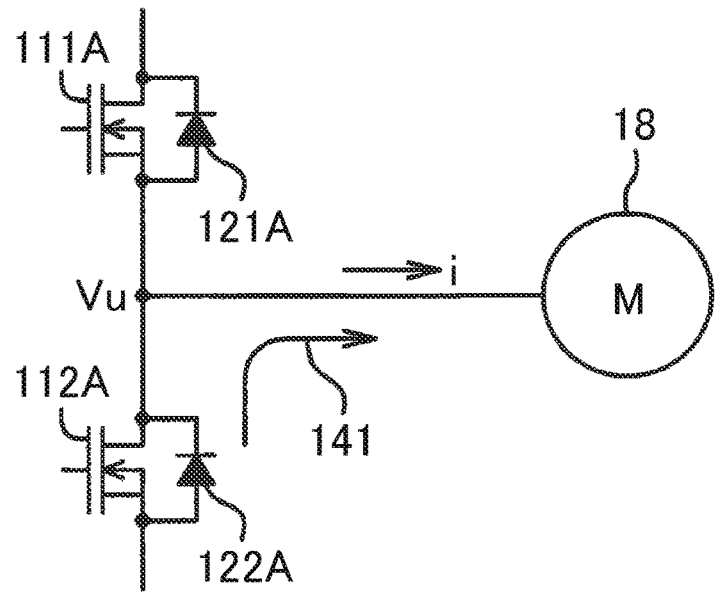
FIG. 10A illustrates a current path during a dead time period with a current flowing from the point of connection between an upper FET and a lower FET toward an electric motor.

As indicated by the symbol "i" in FIG. 10A, in a state in which a current is flowing from the point of connection between the upper FET 111A and the lower FET 112A toward the electric motor 18, a current flows through the diode 122A, which is connected in inverse parallel with the lower FET 112A, as indicated by an arrow 141 during a dead time period. Thus, the output voltage (phase voltage) Vu is at L level during the dead time period. Therefore, the period during which the phase voltage Vu is at L level is the same as an off period of the upper FET 111A.

Figure 10B:
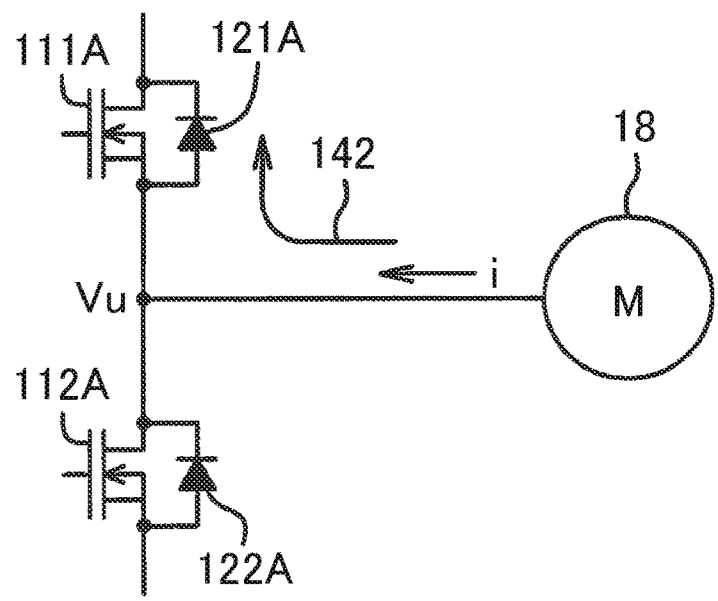
FIG. 10B illustrates a current path during a dead time period with a current flowing from the electric motor toward the point of connection between the upper FET and the lower FET.

As indicated by the symbol "i" in FIG. 10B, in a state in which a current is flowing from the electric motor 18 toward the point of connection between the upper FET 111A and the lower FET 112A, on the other hand, a current flows through the diode 121A, which is connected in inverse parallel with the upper FET 111A, as indicated by an arrow 142 during a dead time period. Thus, the output voltage (phase voltage) Vu is at H level during the dead time period. Therefore, the period during which the phase voltage Vu is at L level is shorter than an off period of the upper FET 111A. In other words, the period during which the phase voltage Vu is at H level is longer than an on period of the upper FET 111A.

In the case where the PWM count is equal to or more than half the maximum value of the PWM count (equal to or more than 250) for the first on/off pattern phases, the on time of the upper FETs is longer than that for a case where the PWM count is not equal to or more than half the maximum value of the PWM count. Thus, in the embodiment, for convenience of description, it is considered that a current is flowing from the point of connection between the upper FET and the lower FET toward the electric motor 18 (as illustrated in FIG. 10A) in the case where the PWM count is equal to or more than 250. Therefore, it is considered that the output voltage (phase voltage) is at L level during a dead time period. Thus, in this case, it is considered that the phase voltage is varied as indicated in (c) in FIG. 9, and thus the level variation timing of the phase voltage and the switching timing of the upper FET coincide with each other.

In the case where the PWM count is not equal to or more than half the maximum value of the PWM count (not equal to or more than 250) for the first on/off pattern phases, on the other hand, the on time of the upper FETs is shorter than that for a case where the PWM count is equal to or more than half the maximum value of the PWM count. Thus, in the embodiment, for convenience of description, it is considered that a current is flowing from the electric motor 18 toward the point of connection between the upper FET and the lower FET (as illustrated in FIG. 10B) in the case where the PWM count is not equal to or more than 250. Therefore, it is considered that the output voltage (phase voltage) is at H level during a dead time period. Thus, in this case, it is considered that the phase voltage is varied as indicated in (d) in FIG. 9, and thus the level variation timing of the phase voltage and the switching timing of the upper FET do not coincide with each other. A virtual PWM count (switching timing determined in consideration of the dead time) at which the switching timing of the upper FET coincides with the level variation timing of the phase voltage has a value obtained by adding a count value (in the embodiment, "10") corresponding to the dead time to the actual PWM count.

In the case where the PWM count is equal to or more than half the maximum value of the PWM count (equal to or more than 250) for the second on/off pattern phases, the on time of the upper FETs is shorter than that for a case where the PWM count is not equal to or more than half the maximum value of the PWM count. Thus, in the embodiment, for convenience of description, it is considered that a current is flowing from the electric motor 18 toward the point of connection between the upper FET and the lower FET (as illustrated in FIG. 10B) in the case where the PWM count is equal to or more than 250. Therefore, it is considered that the output voltage (phase voltage) is at H level during a dead time period. Thus, in this case, it is considered that the phase voltage is varied as indicated in (g) in FIG. 9, and thus the level variation timing of the phase voltage and the switching timing of the upper FET do not coincide with each other. A virtual PWM count (switching timing determined in consideration of the dead time) at which the switching timing of the upper FET coincides with the level variation timing of the phase voltage has a value obtained by subtracting a count value (in the embodiment, "10") corresponding to the dead time from the actual PWM count.

In the case where the PWM count is not equal to or more than half the maximum value of the PWM count (not equal to or more than 250) for the second on/off pattern phases, on the other hand, the on time of the upper FETs is longer than that for a case where the PWM count is equal to or more than half the maximum value of the PWM count. Thus, in the embodiment, for convenience of description, it is considered that a current is flowing from the point of connection between the upper FET and the lower FET toward the electric motor 18 (as illustrated in FIG. 10A) in the case where the PWM count is not equal to or more than 250. Therefore, it is considered that the output voltage (phase voltage) is at L level during a dead time period. Thus, in this case, it is considered that the phase voltage is varied as indicated in (h) in FIG. 9, and thus the level variation timing of the phase voltage and the switching timing of the upper FET coincide with each other.

In the embodiment, for convenience of description, the direction of the phase current in the first system and the second system is estimated on the basis of whether or not the PWM count is equal to or more than half the maximum value of the PWM count. However, the direction of the phase current may be estimated on the basis of a detected value of the phase current. In step S3, for each PWM count in the PWM cycle Tc for each phase in each system set in steps S1 and S2, the common mode noise reduction section 42 computes a PWM count (PWM count at the actual timing) corresponding to the level variation timing of the output voltage (phase voltage) for the relevant phase.

Specifically, for a PWM count that is equal to or more than 250, of the PWM counts $Cu_1$ and $Cv_1$ for U-phase and V-phase in the first system and the PWM count $Cu_2$ for U-phase in the second system for each PWM cycle Tc in the next current control cycle Ta, the common mode noise reduction section 42 sets the value of the PWM count, as it is, as the PWM count corresponding to the level variation timing of the output voltage (phase voltage) for the relevant phase.

For a PWM count that is not equal to or more than 250, of the PWM counts $Cu_1$ and $Cv_1$ for U-phase and V-phase in the first system and the PWM count $Cu_2$ for U-phase in the second system, the common mode noise reduction section 42 sets a value obtained by adding a count value (in the embodiment, "10") corresponding to the dead time to the value of the PWM count as the PWM count corresponding to the level variation timing of the output voltage (phase voltage) for the relevant phase.

For a PWM count that is equal to or more than 250, of the PWM count $Cw_1$ for W-phase in the first system and the PWM counts $Cv_2$ and $Cw_2$ for V-phase and W-phase in the second system for each PWM cycle Tc in the next current control cycle Ta, the common mode noise reduction section 42 sets a value obtained by subtracting a count value (in the embodiment, "10") corresponding to the dead time from the value of the PWM count as the PWM count corresponding to the level variation timing of the output voltage (phase voltage) for the relevant phase.

For a PWM count that is not equal to or more than 250, of the PWM count $Cw_1$ for W-phase in the first system and the PWM counts $Cv_2$ and $Cw_2$ for V-phase and W-phase in the second system, the common mode noise reduction section 42 sets the value of the PWM count, as it is, as the PWM count corresponding to the level variation timing of the output voltage (phase voltage) for the relevant phase. In the case where the PWM count in each PWM cycle for each phase in each system set in steps S1 and S2 is as indicated in FIG. 11A, the PWM count in each PWM cycle for each phase in each system set in step S3 is as indicated in FIG. 11B. From a comparison between FIGS. 11A and 11B, it is seen that the PWM count $Cw_1$ for W-phase in the first system is varied from 400 to 390. It is also seen that the PWM count $Cu_2$ for U-phase in the second system is varied from 200 to 210, and that the PWM count $Cw_2$ for W-phase in the second system is varied from 300 to 290.

Next, the common mode noise reduction section 42 sets one of the phases in the first system, the PWM count for which set in the process in step S3 is the closest to the maximum value (in the embodiment, "500") or the minimum value (in the embodiment, "0") of the PWM count, as a first reference phase (step S4). In the example in FIG. 11B, the PWM count $Cw_1$ ($Cw_1$=390) for W-phase (corresponding to C-phase) in the first system is the closest to 500 or 0, and thus C-phase (W-phase) in the first system is set as the first reference phase. In the embodiment, in the case where C-phase in the first system or the second system is set as a reference phase (the first reference phase or a second reference phase to be discussed later), one of the two phases other than C-phase in the relevant system is referred to as A-phase in the relevant system, and the other is referred to as B-phase in the relevant system. In the case where C-phase in the first system is set as the first reference phase as discussed earlier, U-phase, of U-phase and V-phase in the first system which are the two phases other than C-phase in the first system, is referred to as A-phase in the first system, and V-phase is referred to as B-phase in the first system.

Next, the common mode noise reduction section 42 determines whether or not the first reference phase is C-phase in the first system (step S5). In the example in FIG. 11B, W-phase in the first system is set as the first reference phase, and thus it is determined that the first reference phase is C-phase. In the case where it is determined that the first reference phase is C-phase (step S5: YES), the common mode noise reduction section 42 performs a first PWM count change process (step S6).

The first PWM count change process will be described in detail using FIGS. 11A and 11B as an example. In the example in FIG. 11B, as discussed earlier, W-phase in the first system is set as the first reference phase. In the first PWM count change process, the common mode noise reduction section 42 first assigns two phases, namely A-phase (U-phase) and B-phase (V-phase), in the first system as count change target phases, the PWM count for which is to be changed in order to cancel out a noise current for C-phase (W-phase) in the first system which is the first reference phase. Hereinafter, A-phase (U-phase) in the first system will be referred to as a first count change target phase, and B-phase (V-phase) in the first system will be referred to as a second count change target phase.

Then, the common mode noise reduction section 42 sets an amplitude for canceling out a noise current for the count change target phases in the first system (in the example, A-phase (U-phase) and B-phase (V-phase) in the first system). In order to change a PWM count value for a certain count change target phase such that the total value of PWM count values in the current control cycle Ta is not changed, it is only necessary that one of an amplitude that matches a first amplitude pattern and an amplitude that matches a second amplitude pattern indicated in FIG. 12A, for example, should be added to the PWM count value for the relevant count change target phase. The symbol "x" in FIG. 12A indicates an amplitude prescription value that prescribes the absolute value of the amplitude.

The first count change target phase (A-phase (U-phase)) and the second count change target phase (B-phase (V-phase)) in the first system have the same on/off pattern for the upper and lower FETs, and therefore different amplitude patterns are assigned thereto. In the embodiment, the first amplitude pattern is assigned to the first count change target phase (A-phase (U-phase)) in the first system, and the second amplitude pattern is assigned to the second count change target phase (B-phase (V-phase)).

The common mode noise reduction section 42 computes the amplitude prescription value x for each of A-phase (U-phase) as the first count change target phase and B-phase (V-phase) as the second count change target phase on the basis of the PWM count in the first system, which is set in the process in step S3, as follows. The common mode noise reduction section 42 computes the absolute value of the difference between the PWM count for A-phase (U-phase) and the PWM count for C-phase (W-phase), a noise current for which should be canceled out, as the amplitude prescription value x for A-phase (U-phase). In the example, the amplitude prescription value x for A-phase (U-phase) is 90 (=390−300). The common mode noise reduction section 42 computes the absolute value of the difference between the PWM count for B-phase (V-phase) and the PWM count for C-phase (W-phase), a noise current for which should be canceled out, as the amplitude prescription value x for B-phase (V-phase). In the example, the amplitude prescription value x for B-phase (V-phase) is 40 (=390−350).

The common mode noise reduction section 42 sets an amplitude in each PWM cycle Tc for each count change target phase on the basis of the amplitude prescription value x for each count change target phase computed in this manner and the amplitude pattern which is assigned to the relevant phase. The amplitudes in each PWM cycle Tc for U-phase and V-phase in the first system, which are set on the basis of the PWM counts in the first system indicated in FIG. 11B, are indicated in FIG. 12B.

Next, the common mode noise reduction section 42 changes the PWM count for the count change target phase in the first system, which is set in step S3, in accordance with the amplitude for the count change target phase. More specifically, the common mode noise reduction section 42 changes the PWM count for the count change target phase in the first system in each PWM cycle Tc by adding the amplitude for the count change target phase to the PWM count for the count change target phase in the first system in each PWM cycle Tc which is set in step S3. Consequently, the first PWM count change process is ended. Then, the common mode noise reduction section 42 proceeds to step S8.

In the case where the PWM count in each PWM cycle for each phase in the first system, which is set in step S3, has a value indicated in FIG. 11B and the amplitudes for the count change target phases in the first system have values indicated in FIG. 12B, the PWM count in each PWM cycle for each phase in the first system after the first PWM count change process is as indicated in FIG. 12C. In the case where it is determined in step S5 that the first reference phase is not C-phase in the first system (step S5: NO), the common mode noise reduction section 42 performs a second PWM count change process (step S7). The second PWM count change process will be discussed later. When the second PWM count change process is ended, the common mode noise reduction section 42 proceeds to step S8.

In step S8, the common mode noise reduction section 42 sets one of the phases in the second system, the PWM count for which set in the process in step S3 is the closest to the maximum value (in the embodiment, "500") or the minimum value (in the embodiment, "0") of the PWM count, as a second reference phase. In the example in FIG. 11B, the PWM count $Cv_2$ ($Cv_2$=100) for V-phase in the second system is the closest to 500 or 0, and thus V-phase (corresponding to A-phase or B-phase) in the second system is set as the second reference phase. In the embodiment, in the case where one of A-phase and B-phase in the first system or the second system is set as a reference phase (the first reference phase or the second reference phase), one of the phases that is set as a reference phase is referred to as A-phase in the relevant system, and the other is referred to as B-phase in the relevant system. In the case where V-phase in the second system is set as the second reference phase as discussed earlier, V-phase in the second system is determined as A-phase in the second system, and W-phase in the second system is determined as B-phase in the second system.

Next, the common mode noise reduction section 42 determines whether or not the second reference phase is C-phase in the second system (step S9). In the example in FIG. 11B, V-phase in the second system is set as the second reference phase, and thus it is determined that second reference phase is not C-phase. In the case where it is determined that the second reference phase is not C-phase (step S9: NO), the common mode noise reduction section 42 performs a fourth PWM count change process (step S11). In the fourth PWM count change process, the common mode noise reduction section 42 assigns C-phase (U-phase) in the second system as a first count change target phase, the PWM count for which is to be changed in order to cancel out a noise current for A-phase (V-phase) which is the second reference phase. The common mode noise reduction section 42 assigns one (in the example, B-phase (W-phase)) of A-phase and B-phase in the second system that is not the second reference phase as a second count change target phase, the PWM count for which is to be changed in order to cancel out a noise current for C-phase (U-phase) after a count change.

The common mode noise reduction section 42 sets an amplitude for canceling out a noise current for the count change target phases (in the example, C-phase (U-phase) and B-phase (W-phase)) in the second system. In order to change a PWM count value for a certain count change target phase such that the total value of PWM count values in the current control cycle Ta is not changed, it is only necessary that one of an amplitude that matches a first amplitude pattern and an amplitude that matches a second amplitude pattern indicated in FIG. 12A, for example, should be added to the PWM count value for the relevant count change target phase.

The first count change target phase (C-phase (U-phase)) and the second count change target phase (B-phase (W-phase)) in the second system have different on/off patterns for the upper and lower FETs. Therefore, the same amplitude pattern is assigned thereto. In the embodiment, the first amplitude pattern is assigned to the first count change target phase (C-phase (U-phase)) and the second count change target phase (B-phase (W-phase)) in the second system.

The common mode noise reduction section 42 computes the amplitude prescription value x for each of C-phase (U-phase) as the first count change target phase and B-phase (W-phase) as the second count change target phase on the basis of the PWM count in the second system, which is set in the process in step S3, as follows. The common mode noise reduction section 42 computes the absolute value of the difference between the PWM count for C-phase (U-phase) and the PWM count for the second reference phase (A-phase (V-phase)), a noise current for which should be canceled out, as the amplitude prescription value x for C-phase (U-phase). In the example, the amplitude prescription value x for C-phase (U-phase) is 110 (=210−100). Consequently, a first computation value obtained by adding the amplitude prescription value x for C-phase (U-phase) to the PWM count for C-phase (U-phase) is 320 (=210+110), and a second computation value obtained by subtracting the amplitude prescription value x for C-phase (U-phase) from the PWM count for C-phase (U-phase) is 100 (=210−110).

The common mode noise reduction section 42 computes the absolute value of the difference between one (in the example, the first computation value) of the first computation value and the second computation value that is different from the PWM count for A-phase (V-phase), which is the second reference phase, and the PWM count for B-phase (W-phase) as the amplitude prescription value x for B-phase (W-phase). In the example, the amplitude prescription value x for B-phase (W-phase) is 30 (=320−290).

The common mode noise reduction section 42 sets an amplitude in each PWM cycle Tc for each count change target phase in the second system on the basis of the amplitude prescription value x for each count change target phase in the second system computed in this manner and the amplitude pattern which is assigned to the relevant phase. The amplitudes in each PWM cycle Tc for C-phase (U-phase) and B-phase (W-phase), which are set on the basis of the PWM counts in the second system indicated in FIG. 11B, are indicated in FIG. 12B.

Next, the common mode noise reduction section 42 changes the PWM count for the count change target phase in the second system, which is set in step S3, in accordance with the amplitude for the count change target phase. More specifically, the common mode noise reduction section 42 changes the PWM count for the count change target phase in each PWM cycle Tc by adding the amplitude for the count change target phase to the PWM count for the count change target phase in the second system in each PWM cycle Tc which is set in step S3. Consequently, the fourth PWM count change process is ended. Then, the common mode noise reduction section 42 proceeds to step S12.

In the case where the PWM count in each PWM cycle for each phase in the second system, which is set in step S3, has a value indicated in FIG. 11B and the amplitudes for the count change target phases in the second system have values indicated in FIG. 12B, the PWM count in each PWM cycle for each phase in the second system after the fourth PWM count change process is as indicated in FIG. 12C. In the case where it is determined in step S9 that the second reference phase is C-phase in the second system (step S9: YES), the common mode noise reduction section 42 performs a third PWM count change process (step S10). Then, the common mode noise reduction section 42 proceeds to step S12. The third PWM count change process is the same as the first PWM count change process in step S6 discussed earlier. That is, it is only necessary to replace A-phase, B-phase, and C-phase in the first system in the description of step S6 provided earlier with A-phase, B-phase, and C-phase in the second system, respectively. In this case, in the embodiment, U-phase in the second system serves as C-phase, one of V-phase and W-phase in the second system serves as A-phase in the second system, and the other serves as B-phase in the second system.

The second PWM count change process in step S7 is the same as the fourth PWM count change process in step S11 discussed earlier. That is, it is only necessary to replace A-phase, B-phase, and C-phase in the second system in the description of step S11 provided earlier with A-phase, B-phase, and C-phase in the first system, respectively. In this case, in the embodiment, W-phase in the first system serves as C-phase in the first system, one of U-phase and V-phase in the first system that is set as the first reference phase in step S4 serves as A-phase in the first system, and the other serves as B-phase in the first system.

Hereinafter, the PWM count in each PWM cycle Tc for each phase in the first system after the PWM count is changed in step S6 or S7 and the PWM count in each PWM cycle Tc for each phase in the second system after the PWM count is changed in step S10 or S11 will be occasionally referred to as "in-system cancellation PWM counts". In step S12, the common mode noise reduction section 42 performs a PWM count shift amount computation process for reducing common mode noise between the systems. Specifically, the common mode noise reduction section 42 computes a PWM count shift amount for canceling out portions, for which a noise current has not been canceled out within the system, between the systems on the basis of the "in-system cancellation PWM counts".

The PWM count shift amount computation process will be described below using a case where the "in-system cancellation PWM counts" have values indicated in FIG. 12C as an example. In FIG. 12C, PWM counts for phases, a noise current for which is canceled out within the system in the PWM count change process in step S6 or S7 and the change process in step S10 or S11, are underlined.

In odd-numbered PWM cycles Tc, V-phase in the first system and V-phase in the second system are phases, a noise current for which is not canceled out within the system in the PWM count change process discussed earlier. In even-numbered PWM cycles Tc, U-phase in the first system and W-phase in the second system are phases, a noise current for which is not canceled out within the system in the PWM count change process discussed earlier. The common mode noise reduction section 42 computes, in the odd-numbered PWM cycles Tc, a PWM count shift amount for canceling out a noise current generated by the V-phase voltage in the first system with a noise current generated by the V-phase voltage in the second system. Specifically, the common mode noise reduction section 42 computes, in the odd-numbered PWM cycles Tc, a shift amount (hereinafter referred to as a "first shift amount") for the first system and a shift amount (hereinafter referred to as a "second shift amount") for the second system that bring the difference between the PWM count for V-phase in the first system and the PWM count for V-phase in the second system to zero.

For example, the common mode noise reduction section 42 calculates half the absolute value of the difference between the PWM count for V-phase in the first system and the PWM count for V-phase in the second system in the odd-numbered PWM cycles Tc. In the example, half the absolute value of the difference between such PWM counts is 105 (=(310−100)/2). Then, the common mode noise reduction section 42 sets the first shift amount to −105, and sets the second shift amount to 105.

The common mode noise reduction section 42 computes, in the even-numbered PWM cycles Tc, a PWM count shift amount for canceling out a noise current generated by the U-phase voltage in the first system with a noise current generated by the W-phase voltage in the second system. Specifically, the common mode noise reduction section 42 computes, in the even-numbered PWM cycles Tc, a shift amount (hereinafter referred to as a "third shift amount") for the first system and a shift amount (hereinafter referred to as a "fourth shift amount") for the second system that bring the difference between the PWM count for U-phase in the first system and the PWM count for W-phase in the second system to zero.

For example, the common mode noise reduction section 42 calculates half the absolute value of the difference between the PWM count for U-phase in the first system and the PWM count for W-phase in the second system in the even-numbered PWM cycles Tc. In the example, half the absolute value of the difference between such PWM counts is 25 (=(260−210)/2). Then, the common mode noise reduction section 42 sets the third shift amount to 25, and sets the fourth shift amount to −25.

Next, the common mode noise reduction section 42 changes the "in-system cancellation PWM counts" on the basis of the first to fourth shift amounts which are set in step S12 (step S13). Specifically, the common mode noise reduction section 42 shifts (adds) the PWM count for each phase in the first system in the odd-numbered PWM cycles Tc, of the "in-system cancellation PWM counts", by the first shift amount. The common mode noise reduction section 42 shifts (adds) the PWM count for each phase in the second system in the odd-numbered PWM cycles Tc, of the "in-system cancellation PWM counts", by the second shift amount.

The common mode noise reduction section 42 shifts (adds) the PWM count for each phase in the first system in the even-numbered PWM cycles Tc, of the "in-system cancellation PWM counts", by the third shift amount. The common mode noise reduction section 42 shifts (adds) the PWM count for each phase in the second system in the even-numbered PWM cycles Tc, of the "in-system cancellation PWM counts", by the fourth shift amount.

In the case where the "in-system cancellation PWM counts" have values indicated in FIG. 12C and the first shift amount, the second shift amount, the third shift amount, and the fourth shift amount are −105, 105, 25, and −25, respectively, the PWM counts after the process in step S13 are as indicated in FIG. 13A. Next, the common mode noise reduction section 42 computes the final PWM count for each phase in each system in each PWM cycle from the PWM count for each phase in each system in each PWM cycle after the process in step S13 (step S14).

As discussed earlier, the PWM count for each phase in each system in each PWM cycle set in steps S1 and S2 has been converted into a PWM count at the actual timing (a PWM count corresponding to the level variation timing of the phase voltage) in step S3. Then, a PWM count for each phase in each system in each PWM cycle after the process in step S13 has been obtained on the basis of the PWM count at the actual timing.

Thus, the common mode noise reduction section 42 subtracts ten from the PWM count, to which ten was added in step S3, for each phase in each system in each PWM cycle after the process in step S13, and adds ten to such a PWM count, from which ten was subtracted in step S3. In the example in FIG. 13A, the common mode noise reduction section 42 adds ten to the PWM counts for W-phase in the first system and for W-phase in the second system, and subtracts ten from the PWM count for U-phase in the second system. As a result, the final PWM count for each phase in each system in each PWM cycle is as indicated in FIG. 13B.

Lastly, the common mode noise reduction section 42 provides the first PWM output section 43A with the final PWM counts $Cu_1$, $Cv_1$, and $Cw_1$ for U-phase, V-phase, and W-phase in the first system in each PWM cycle obtained in step S14 as the PWM counts $Cu_1$, $Cv_1$, and $Cw_1$ for U-phase, V-phase, and W-phase in the first system for each PWM cycle Tc in the next current control cycle Ta. The common mode noise reduction section 42 provides the second PWM output section 43B with the final PWM counts $Cu_2$, $Cv_2$, and $Cw_2$ for U-phase, V-phase, and W-phase in the second system in each PWM cycle obtained in step S14 as the PWM counts $Cu_2$, $Cv_2$, and $Cw_2$ for U-phase, V-phase, and W-phase in the second system for each PWM cycle Tc in the next current control cycle Ta (step S15). Then, the common mode noise reduction section 42 ends the process in the present current control cycle Ta.

As indicated in FIG. 13A, in the odd-numbered PWM cycles Tc, the PWM count at the actual timing for U-phase (first on/off pattern phase) in the first system and the PWM count at the actual timing for W-phase (second on/off pattern phase) in the first system coincide with each other. Therefore, in the odd-numbered PWM cycles Tc, a noise current that flows through the stray capacitance C1 (see FIG. 3) on the first motor coil 18A side because of an output voltage (phase voltage) for U-phase in the first system is canceled out with a noise current that flows through the stray capacitance C1 on the first motor coil 18A side because of an output voltage (phase voltage) for W-phase in the first system. Consequently, common mode noise is reduced.

In the odd-numbered PWM cycles Tc, the PWM count at the actual timing for U-phase (first on/off pattern phase) in the second system and the PWM count at the actual timing for W-phase (second on/off pattern phase) in the second system coincide with each other. Therefore, in the odd-numbered PWM cycles Tc, a noise current that flows through the stray capacitance C2 (see FIG. 3) on the second motor coil 18B side because of an output voltage (phase voltage) for U-phase in the second system is canceled out with a noise current that flows through the stray capacitance C2 on the second motor coil 18B side because of an output voltage (phase voltage) for W-phase in the second system. Consequently, common mode noise is reduced.

In the odd-numbered PWM cycles Tc, further, the PWM count at the actual timing for V-phase (first on/off pattern phase) in the first system and the PWM count at the actual timing for V-phase (second on/off pattern phase) in the second system coincide with each other. Therefore, in the odd-numbered PWM cycles Tc, a noise current that flows through the stray capacitance C1 (see FIG. 3) on the first motor coil 18A side because of an output voltage (phase voltage) for V-phase in the first system is canceled out with a noise current that flows through the stray capacitance C2 on the second motor coil 18B side because of an output voltage (phase voltage) for V-phase in the second system. Consequently, common mode noise is reduced.

In the even-numbered PWM cycles Tc, the PWM count at the actual timing for V-phase (first on/off pattern phase) in the first system and the PWM count at the actual timing for W-phase (second on/off pattern phase) in the first system coincide with each other. Therefore, in the even-numbered PWM cycles Tc, a noise current that flows through the stray capacitance C1 (see FIG. 3) on the first motor coil 18A side because of an output voltage (phase voltage) for V-phase in the first system is canceled out with a noise current that flows through the stray capacitance C1 on the first motor coil 18A side because of an output voltage (phase voltage) for W-phase in the first system. Consequently, common mode noise is reduced.

In the even-numbered PWM cycles Tc, the PWM count at the actual timing for U-phase (first on/off pattern phase) in the second system and the PWM count at the actual timing for V-phase (second on/off pattern phase) in the second system coincide with each other. Therefore, in the even-numbered PWM cycles Tc, a noise current that flows through the stray capacitance C2 (see FIG. 3) on the second motor coil 18B side because of an output voltage (phase voltage) for U-phase in the second system is canceled out with a noise current that flows through the stray capacitance C2 on the second motor coil 18B side because of an output voltage (phase voltage) for V-phase in the second system. Consequently, common mode noise is reduced.

In the even-numbered PWM cycles Tc, further, the PWM count at the actual timing for U-phase (first on/off pattern phase) in the first system and the PWM count at the actual timing for W-phase (second on/off pattern phase) in the second system coincide with each other. Therefore, in the even-numbered PWM cycles Tc, a noise current that flows through the stray capacitance C1 (see FIG. 3) on the first motor coil 18A side because of an output voltage (phase voltage) for U-phase in the first system is canceled out with a noise current that flows through the stray capacitance C2 on the second motor coil 18B side because of an output voltage (phase voltage) for W-phase in the second system. Consequently, common mode noise is reduced.

The difference between the total values of the final PWM counts for two phases in the first system in FIG. 13B is the same as the difference between the total values of the final PWM counts for two phases in the first system in FIG. 11A. The difference between the total values of the final PWM counts for two phases in the second system in FIG. 13B is the same as the difference between the total values of the final PWM counts for two phases in the second system in FIG. 11A. Therefore, intended voltages can be applied as phase voltages even if PWM counts are changed by the common mode noise reduction section 42.

In the embodiment, the present invention is applied to a motor control device for an electric power steering system. However, the present invention is also applicable to a motor control device that is used for devices other than an electric power steering system. Besides, a variety of design changes may be made without departing from the scope defined in the claims.

What is claimed is:
1. A motor control device that controls an electric motor that has motor coils for three phases in two systems including a first system and a second system, the motor control device comprising:

a pulse width modulation (PWM) count computation unit that computes a PWM count for each phase in each system in each current control cycle that includes a plurality of PWM cycles;
a PWM count setting unit that sets the PWM count for each phase in each system in a current control cycle as a PWM count in each PWM cycle in the relevant current control cycle for the corresponding phase in the corresponding system; and
a common mode noise reduction unit, wherein
the common mode noise reduction unit includes
a first reduction unit that performs a first noise reduction process such that, in the first system, a current that flows through a stray capacitance because of an output voltage for one phase is canceled out with a current that flows through the stray capacitance because of an output voltage for at least one of the two other phases in at least one PWM cycle in the current control cycle, the first noise reduction process including changing a PWM count in a PWM cycle for at least one of the two other phases,
a second reduction unit that performs a second noise reduction process such that, in the second system, a current that flows through a stray capacitance because of an output voltage for one phase is canceled out with a current that flows through the stray capacitance because of an output voltage for at least one of the two other phases in at least one PWM cycle in the current control cycle, the second noise reduction process including changing a PWM count in a PWM cycle for at least one of the two other phases, and
a third reduction unit that performs a third noise reduction process in the case where the two systems have a phase, a current for which that flows through a stray capacitance is not canceled out in at least one PWM cycle in the current control cycle after the first noise reduction process is performed by the first reduction unit and the second noise reduction process is performed by the second reduction unit, the third noise reduction process including shifting a PWM count for each phase in the first system by a first predetermined amount and shifting a PWM count for each phase in the second system by a second predetermined amount such that the currents for such a phase which flow through the stray capacitances in the two systems cancel out each other in the relevant PWM cycle.

2. The motor control device according to claim 1, wherein the first reduction unit includes
a first change unit that changes a PWM count in a PWM cycle such that a current that flows through a stray capacitance because of an output voltage for a first phase, which is one of the phases in the first system, is canceled out with a current that flows through the stray capacitance because of an output voltage for a second phase, which is one of the two other phases, in half a predetermined number of PWM cycles in the current control cycle, and such that the current that flows through the stray capacitance because of the output voltage for the first phase is canceled out with a current that flows through the stray capacitance because of an output voltage for a third phase, which is the other of the two other phases, in the other half of the predetermined number of PWM cycles in the current control cycle, a second change unit that changes a PWM count in a PWM cycle such that the current that flows through the stray capacitance because of the output voltage for the first phase, which is the one of the phases in the first system, is canceled out with the current that flows through the stray capacitance because of the output voltage for the second phase, which is the one of the two other phases, in half the predetermined number of PWM cycles in the current control cycle, and such that the current that flows through the stray capacitance because of the output voltage for the second phase is canceled out with the current that flows through the stray capacitance because of the output voltage for the third phase, which is the other of the two other phases, in the other half of the predetermined number of PWM cycles in the current control cycle, and a first selection unit that selects one of the first change unit and the second change unit as a change unit in accordance with a predetermined determination criterion in each current control cycle, the change unit changing a PWM count in a PWM cycle.

3. The motor control device according to claim 2, wherein the second reduction unit includes a third change unit that changes a PWM count in a PWM cycle such that a current that flows through a stray capacitance because of an output voltage for a fourth phase, which is one of the phases in the second system, is canceled out with a current that flows through the stray capacitance because of an output voltage for a fifth phase, which is one of the two other phases, in half a predetermined number of PWM cycles in the current control cycle, and such that the current that flows through the stray capacitance because of the output voltage for the fourth phase is canceled out with a current that flows through the stray capacitance because of an output voltage for a sixth phase, which is the other of the two other phases, in the other half of the predetermined number of PWM cycles in the current control cycle, a fourth change unit that changes a PWM count in a PWM cycle such that the current that flows through the stray capacitance because of the output voltage for the fourth phase, which is the one of the phases in the second system, is canceled out with the current that flows through the stray capacitance because of the output voltage for the fifth phase, which is the one of the two other phases, in half the predetermined number of PWM cycles in the current control cycle, and such that the current that flows through the stray capacitance because of the output voltage for the fifth phase is canceled out with the current that flows through the stray capacitance because of the output voltage for the sixth phase, which is the other of the two other phases, in the other half of the predetermined number of PWM cycles in the current control cycle, and a second selection unit that selects one of the third change unit and the fourth change unit as a change unit in accordance with a predetermined determination criterion in each current control cycle, the change unit changing a PWM count in a PWM cycle.

* * * * *